United States Patent
Hanekamp, Jr. et al.

(10) Patent No.: US 12,400,075 B2
(45) Date of Patent: Aug. 26, 2025

(54) DEFINING AND DEBUGGING MODULE COMPLETENESS GRAPHS BASED ON INTERACTIVE USER INTERFACE CHECKLIST ELEMENTS

(71) Applicant: INTUIT INC., Mountain View, CA (US)

(72) Inventors: David Alan Hanekamp, Jr., Carlsbad, CA (US); Eric Knudtson, Mountain View, CA (US); Anoop Makwana, Bangalore (IN)

(73) Assignee: INTUIT INC., Mountain View, CA (US)

( * ) Notice: Subject to any disclaimer, the term of this patent is extended or adjusted under 35 U.S.C. 154(b) by 1093 days.

(21) Appl. No.: 17/364,553

(22) Filed: Jun. 30, 2021

(65) Prior Publication Data
US 2023/0004828 A1    Jan. 5, 2023

(51) Int. Cl.
G06F 40/226 (2020.01)
G06F 18/21 (2023.01)
G06F 40/174 (2020.01)
G06N 5/022 (2023.01)

(52) U.S. Cl.
CPC ........ *G06F 40/226* (2020.01); *G06F 18/2178* (2023.01); *G06F 40/174* (2020.01); *G06N 5/022* (2013.01)

(58) Field of Classification Search
None
See application file for complete search history.

(56) References Cited

U.S. PATENT DOCUMENTS

| | | | | |
|---|---|---|---|---|
| 7,644,350 B2 * | 1/2010 | Piersol | ................. | G06F 40/226 715/224 |
| 7,725,483 B2 * | 5/2010 | Poyourow | ............ | G06F 16/215 707/763 |
| 9,348,807 B2 * | 5/2016 | McGuire | ............... | G06F 40/274 |
| 10,013,721 B1 * | 7/2018 | Laaser | ................ | G06Q 40/123 |
| 11,138,370 B1 * | 10/2021 | Krishnaswamy | ....... | G06F 40/18 |
| 12,190,053 B2 * | 1/2025 | Logan | ................. | H04L 67/1097 |
| 2002/0198876 A1 * | 12/2002 | Zielinski | ............. | G06F 9/45512 |
| 2004/0073868 A1 * | 4/2004 | Easter | ................... | G06F 40/174 715/225 |
| 2005/0268217 A1 * | 12/2005 | Garrison | ............... | G06F 40/174 707/999.001 |
| 2007/0027847 A1 * | 2/2007 | Weinberg | ............ | G06F 16/2428 |
| 2011/0119286 A1 * | 5/2011 | McGuire | ................. | G06F 40/18 707/767 |

(Continued)

*Primary Examiner* — Irete F Ehichioya
*Assistant Examiner* — Phoebe X Pan
(74) *Attorney, Agent, or Firm* — Patterson + Sheridan, LLP

(57) ABSTRACT

Certain aspects of the present disclosure provide techniques for encoding rules defining a completeness of input, including receiving a first input comprising one or more tuples, wherein a tuple of the one or more tuples comprises one or more fields associated with an operation, one or more indicators, and one or more modifiers; receiving a second input associated with the one or more tuples; providing, to a knowledge engine, the first input and the second input; receiving, from the knowledge engine, a result based on the first input and the second input; determining, based on the result, a first symbol associated with a first tuple of the one or more tuples; and displaying the first symbol, wherein the first symbol indicates whether the first tuple is complete.

16 Claims, 12 Drawing Sheets

(56) References Cited

U.S. PATENT DOCUMENTS

| | | | |
|---|---|---|---|
| 2013/0132325 A1* | 5/2013 | Cohen | G06N 5/025 |
| | | | 706/47 |
| 2014/0029046 A1* | 1/2014 | Ponnavaikko | G06Q 40/02 |
| | | | 358/1.15 |
| 2016/0070733 A1* | 3/2016 | Gould | G06F 40/18 |
| | | | 707/700 |
| 2017/0186099 A1* | 6/2017 | Lubczynski | G06Q 40/123 |
| 2018/0174243 A1* | 6/2018 | Mishra | G06Q 40/123 |
| 2020/0250550 A1* | 8/2020 | Bissell | G06F 3/0481 |
| 2020/0311192 A1* | 10/2020 | Kumar | G06F 40/174 |

\* cited by examiner

|   | A | B | C | D | E |
|---|---|---|---|---|---|
| 1 | Role | Type | Friendly Name | Field | Expression |
| 2 | Input | String | | Name | John Smith |
| 3 | Input | String | User Name | Email | jsmith@intuit.com |
| 4 | Input | Date | User Email | Bday | 4/20/2003 |
| 5 | Constant | Date | User Birthday | 18y | 4/8/2003 |
| 6 | Internal | Decimal | Date 18 Years Ago | Age | 17.97 |
| 7 | Internal | Decimal | Years from User Birthday to Today | Difference | -0.03 |
| 8 | Input | Checkbox | Difference of User Age to Today and 18 Years | Status | |
| 9 | Input | String | Parent or Guardian? | PName | Jane Smith |
| 10 | Input | String | Parent Name | PEmail | janesmith@intuit.com |
| 11 | Input | String | Parent Email | PSign | /jsmith/ |
| 12 | Input | Date | Parent Signature | PDay | 4/7/1965 |
| 13 | Constant | Date | Parent Birthday | 18y | 4/8/2003 |
| 14 | Internal | Decimal | Date 18 Years Ago | PAge | 51.003 |
| 15 | Internal | Decimal | Years from User Birthday to Today | PDifference | 33.003 |
| 16 | Input | String | Difference of P. Age to Today and 18 Years | GName | |
| 17 | Input | String | Guardian Name | GEmail | |
| 18 | Input | Date | Guardian Email | GSign | |
| 19 | Input | Date | Guardian Signature | GDay | |
| 20 | Constant | Date | Guardian Birthday | 18y | |
| 21 | Internal | Decimal | Date 18 Years Ago | GAge | |
| 22 | Internal | Decimal | Years from User Birthday to Today | GDifference | |
| 23 | Output | String | Difference of G. Age to Today and 18 Years | Legal | Yes |
| | | | At Legal Age | | |

FIG. 2

| | A | B | C | D | E | F | G |
|---|---|---|---|---|---|---|---|
| 1 | MODULE | LEGAL AGE | IS COMPLETE WHEN | ALL OF | THESE ARE COMPLETE | | AND? |
| 2 | | NAME | | | | | |
| 3 | | EMAIL | MUST BE ASKED WHEN | NAME | EQUALS | UNKNOWN | |
| 4 | | BDAY | | | | | |
| 5 | | THIS LIST WILL SHORT CIRCUIT | WHEN | AGE | IS LESS THAN | 13 | |
| 6 | | LIST-PARENT | WHEN | AGE | IS LESS THAN | 18 | |
| 7 | | LIST-GUARDIAN | WHEN | AGE | IS LESS THAN | 18 | AND |
| 8 | | | WHEN | PNAME | EQUALS | UNKNOWN | |
| 9 | | | | | | | |
| 10 | LIST | PARENT | IS COMPLETE WHEN | ALL OF | THESE ARE COMPLETE | | |
| 11 | | PNAME | | | | | |
| 12 | | PEMAIL | | | | | |
| 13 | | PSIGN | | | | | |
| 14 | | PDAY | | | | | |
| 15 | | THIS LIST WILL BE COMPLETE ONLY | WHEN | PAGE | IS GREATER THAN | 18 | |
| 16 | | | | | | | |
| 17 | List | GUARDIAN | IS COMPLETE WHEN | ALL OF | THESE ARE COMPLETE | | |
| 18 | | GNAME | | | | | |
| 19 | | GEMAIL | | | | | |
| 20 | | GSIGN | | | | | |
| 21 | | GDAY | | | | | |
| 22 | | THIS LIST WILL BE COMPLETE ONLY | WHEN | GAGE | IS GREATER THAN | 18 | |

| | A | B | C | D | E | F | G | H | I | J | K |
|---|---|---|---|---|---|---|---|---|---|---|---|
| 1 | | | | | | | | | | | |
| 2 | | | | | | | CONDITION | | | | |
| 3 | SYMBOL | VALUE | LIST TYPE | ITEM/LIST NAME | WHEN | FIELD | OPERATOR | FIELD/ CONSTANT | AND/ OR | LEFT VALUE | RIGHT VALUE |
| 4 | ☑ | | LIST ALL OF | LEGAL AGE | IS COMPLETE WHEN | ALL OF | THESE ARE COMPLETE | | | | |
| 5 | ☑ | JOHN SMITH | | NAME | MUST BE ASKED WHEN | | | | | | |
| 6 | △ | JSMITH@INTUIT.COM | | EMAIL | WHEN | INAME | EQUALS | UNKNOWN | | JOHN SMITH | UNKNOWN |
| 7 | ☑ | 4/20/2003 | | BDAY | WHEN | AGE | IS LESS THAN | 13 | | 18 | 13 |
| 8 | ⬚ | | 518 | THIS LIST WILL SHORT CIRCUIT | WHEN | AGE | IS LESS THAN | 18 | | 18 | 18 |
| 9 | △ | | | LIST-PARENT | | | | | | | |
| 10 | △ | | 510 | LIST-GUARDIAN | IS COMPLETE WHEN 512 | AGE 514 | IS LESS THAN | 18 | AND | 18 | 18 |
| 11 | E | 504 | | | WHEN | PNAME | EQUALS | UNKNOWN | | UNKNOWN | UNKNOWN |
| 12 | ☑ | | | LIST-ADDRESS | | | | | | | |
| 13 | | | | | | | | | | | 516 |
| 14 | ? | | LIST ALL OF | PARENT | IS COMPLETE WHEN | ALL OF | THESE ARE COMPLETE | | | | |
| 15 | ? | UNKNOWN | | PNAME | | | | | | | |
| 16 | ? | UNKNOWN | 528 | PEMAIL | | | | | | | |
| 17 | ? | UNKNOWN | | PSIGN | | | | | | | |
| 18 | ? | UNKNOWN | | PDAY | | 522 PAGE | IS GREATER THAN | 18 | | FALSE | |
| 19 | ? | | 520 | THIS LIST WILL BE COMPLETE ONLY | WHEN | | | | | | 526 |
| 20 | | | | | | 524 | | | | | |
| 21 | ? | | LIST ALL OF | GUARDIAN | IS COMPLETE WHEN | ALL OF | THESE ARE COMPLETE | | | | |
| 22 | ? | UNKNOWN | | GNAME | | | | | | | |
| 23 | ? | UNKNOWN | 538 | GEMAIL | | | | | | | |
| 24 | ? | UNKNOWN | | GSIGN | | | | | | | |
| 25 | ? | UNKNOWN | 508 | GDAY | | GAGE | IS GREATER THAN | 18 | | FALSE | |
| 26 | ? | | 530 | THIS LIST WILL BE COMPLETE ONLY | WHEN | | 532 534 | | | | 536 |
| 27 | | | | | | | | | | | |
| 28 | ☑ | | LIST ALL OF | ADDRESS | | | | | | | |
| 29 | ☑ | CANADA | | COUNTRY | WHEN | COUNTRY | EQUALS | USA | | CANADA | UNITED STATES |
| 30 | △ | | | STATE | | | | | | | |
| 31 | ☑ | EDMONTON | | CITY | | | | | | | |

540 542 544 546 548

| | A | B | C | D | E | F | G | H | I | J | K |
|---|---|---|---|---|---|---|---|---|---|---|---|
| 1 | | | | | | | | | | | |
| 2 | | | | | | | | | | | |
| 3 | SYMBOL | VALUE | LIST TYPE | ITEM/LIST NAME | WHEN | FIELD | CONDITION OPERATOR | FIELD/ CONSTANT | AND/ OR | LEFT VALUE | RIGHT VALUE |
| 4 | ⊕ | | LIST ALL OF | LEGAL AGE | IS COMPLETE WHEN | ALL OF | THESE ARE COMPLETE | | | | |
| 5 | ☑ | JOHN SMITH | | NAME | | | | | | | |
| 6 | △ | JSMITH@INTUIT.COM | | EMAIL | MUST BE ASKED WHEN | NAME | EQUALS | UNKNOWN | | JOHN SMITH | |
| 7 | ☑ | 4/8/2001 | | BDAY | | | | | | | |
| 8 | ⊕ | | | THIS LIST WILL SHORT CIRCUIT | WHEN | AGE | IS LESS THAN | 13 | | 10 | 13 |
| 9 | | | | LIST-PARENT | WHEN | AGE | IS LESS THAN | 18 | | 10 | 18 |
| 10 | | | | LIST-GUARDIAN | IS ONLY ASKED WHEN | AGE | IS LESS THAN | 18 | AND | 10 | 18 |
| 11 | | UNKNOWN | | | WHEN | PNAME | EQUALS | UNKNOWN | | UNKNOWN | UNKNOWN |
| 12 | | | | | IS COMPLETE WHEN | ALL OF | THESE ARE COMPLETE | | | | |
| 13 | | UNKNOWN | LIST ALL OF | PARENT | | | | | | | |
| 14 | ? | UNKNOWN | | PNAME | | | | | | | |
| 15 | ? | UNKNOWN | | PEMAIL | | | | | | | |
| 16 | ? | UNKNOWN | | PSIGN | | | | | | | |
| 17 | ? | UNKNOWN | | PDAY | | | | | | | |
| 18 | ? | UNKNOWN | | THIS LIST WILL BE COMPLETE ONLY | WHEN | PAGE | IS GREATER THAN | 18 | | | |
| 19 | | | | | | | | | | | |
| 20 | ⊕ | | LIST ALL OF | GUARDIAN | IS COMPLETE WHEN | ALL OF | THESE ARE COMPLETE | | | | |
| 21 | ? | UNKNOWN | | GNAME | | | | | | | |
| 22 | ? | UNKNOWN | | GEMAIL | | | | | | | |
| 23 | ? | UNKNOWN | | GSIGN | | | | | | | |
| 24 | ? | UNKNOWN | | GDAY | | | | | | | |
| 25 | ? | | | THIS LIST WILL BE COMPLETE ONLY | WHEN | GAGE | IS GREATER THAN | 18 | | | |

FIG. 6

| | A | B | C | D | E | F | G | H | I | J | K |
|---|---|---|---|---|---|---|---|---|---|---|---|
| 1 | | | | | | | | | | | |
| 2 | | | | | | | | | | | |
| 3 | SYMBOL | VALUE | LIST TYPE | ITEM/LIST NAME | WHEN | FIELD | CONDITION OPERATOR | FIELD/ CONSTANT | AND/ OR | LEFT VALUE | RIGHT VALUE |
| 4 | ⊗ (712a) | | LIST ALL OF | LEGAL AGE | IS COMPLETE WHEN | ALL OF | THESE ARE COMPLETE | | | | |
| 5 | ☑ (712b) | JOHN SMITH | | NAME | | | | | | | |
| 6 | △ | JSMITH@INTUIT .COM | | EMAIL | MUST BE ASKED WHEN | NAME | EQUALS | UNKNOWN | | JOHN SMITH | UNKNOWN |
| 7 | ☒ (712c) | UNKNOWN | | THIS LIST WILL BE COMPLETE ONLY | WHEN | AGE | DOES NOT EQUAL | UNKNOWN | | UNKNOWN | |
| 8 | ? (710) | | | THIS LIST WILL SHORT CIRCUIT | WHEN | AGE | IS LESS THAN | 13 | | FALSE | 13 |
| 9 | ? (712d) | | | LIST-PARENT | WHEN | AGE | IS LESS THAN | 18 | | FALSE | 18 |
| 10 | ? | | | LIST-GUARDIAN | IS ONLY ASKED WHEN | AGE | IS LESS THAN | 18 | AND | FALSE | 18 |
| 11 | | (704) | | | WHEN | PNAME | EQUALS | UNKNOWN | | UNKNOWN | |
| 12 | | | | | | | | | | (708) | |
| 13 | ? (714) | | LIST ALL OF | PARENT | IS COMPLETE WHEN | ALL OF | THESE ARE COMPLETE | | | | |
| 14 | | | | PNAME | | | | | | | |
| 15 | | | | PEMAIL | | | | | | | |
| 16 | | | | PSIGN | | | | | | | |
| 17 | | | | PDAY | | | | | | | |
| 18 | | (706) | | THIS LIST WILL BE COMPLETE ONLY | WHEN | PAGE | IS GREATER THAN | 18 | | | |
| 19 | | | | | | | | | | | |
| 20 | ? (716) | | LIST ALL OF | GUARDIAN | IS COMPLETE WHEN | ALL OF | THESE ARE COMPLETE | | | | |
| 21 | | | | GNAME | | | | | | | |
| 22 | | | | GEMAIL | | | | | | | |
| 23 | | | | GSIGN | | | | | | | |
| 24 | | | | GDAY | | | | | | | |
| 25 | | | | THIS LIST WILL BE COMPLETE ONLY | WHEN | GAGE | IS GREATER THAN | 18 | | | |

| | A | B | C | D | E | F | G | H | I | J | K |
|---|---|---|---|---|---|---|---|---|---|---|---|
| 1 | | | | | | | | | | | |
| 2 | | | 802 | | | | | | | | |
| 3 | SYMBOL | VALUE | LIST TYPE | ITEM/LIST NAME | WHEN | FIELD | CONDITION OPERATOR | FIELD/ CONSTANT | AND/ OR | LEFT VALUE | RIGHT VALUE |
| 4 | ☑ | 850a | LIST ALL OF | LEGAL AGE | IS COMPLETE WHEN | ALL OF | THESE ARE COMPLETE | | | | |
| 5 | ☑ | JOHN SMITH | | NAME | | | | | | | |
| 6 | △ | JSMITH@INTUIT .COM | | EMAIL | MUST BE ASKED WHEN | NAME | EQUALS | UNKNOWN | | JOHN SMITH | UNKNOWN |
| 7 | | 4/20/2003 | | BDAY | | | | | | | |
| 8 | ☐ | 850b | 810 | THIS LIST WILL SHORT CIRCUIT | WHEN 812 | AGE | IS LESS THAN | 13 | | 17.97 | 13 |
| 9 | ☑ | 804 | | LIST-ADULT | WHEN | AGE | IS LESS THAN | 18 | | 17.97 | 18 |
| 10 | | | | | | | | | | 816 | |
| 11 | ☑ | 852a | LIST ANY OF | 818 | IS COMPLETE WHEN | ANY OF | THESE ARE COMPLETE 814 | | | | |
| 12 | ☒ | | 820 | LIST-PAREN | 822 | | | | | | |
| 13 | ☒ | 852b | | LIST-GUARDIAN | | | | | | | |
| 14 | ☒ | 854a | | | | | | 824 | | 826 | |
| 15 | ☒ | UNKNOWN | LIST ALL OF | PARENT | IS COMPLETE WHEN | ALL OF | | | | | |
| 16 | ☒ | UNKNOWN | | PNAME | | | | | | | |
| 17 | ☒ | UNKNOWN | | PEMAIL | | | | | | | |
| 18 | ☒ | UNKNOWN | | PSIGN | | | | | | | |
| 19 | ☒ | UNKNOWN | | PDAY | | | | | | | |
| 20 | ☒ | 854b 808 830 | | THIS LIST WILL BE COMPLETE ONLY | WHEN | PAGE | IS GREATER THAN | 18 | | BLANK | 18 |
| 21 | | | | | | | | | | | |
| 22 | ☑ | 856a | LIST ALL OF | GUARDIAN | IS COMPLETE WHEN | ALL OF | THESE ARE COMPLETE 834 | | | | 836 |
| 23 | ☑ | JOHN SMITH | | GNAME | | | | | | | |
| 24 | ☑ | JSMITH@INTUIT .COM 848 | | GEMAIL | | | | | | | |
| 25 | ☑ | /JSMITH/ | | GSIGN | | | | 844 | | | |
| 26 | ☑ | 4/8/1962 | | GDAY | 842 | | | | | | |
| 27 | ☑ | 856b | 840 | THIS LIST WILL BE COMPLETE ONLY | WHEN | GAGE | IS GREATER THAN | 18 | | 54 | 846 18 |

DEFINING AND DEBUGGING MODULE COMPLETENESS GRAPHS BASED ON INTERACTIVE USER INTERFACE CHECKLIST ELEMENTS

INTRODUCTION

Aspects of the present disclosure relate to defining, generating, and testing a completeness graph of a knowledge engine through input to a user interface (UI) in order to determine if all required fields of a module received required user input in an application.

Knowledge engines contain programs called modules that may execute one or more operations by referencing one or more graphs of the knowledge engine, such as calculation graphs and completeness graphs. Generally, a calculation graph of a module may be used to perform the one or more operations, and a completeness graph of a module may be used to ensure that all input needed for the operations to be completed has been received.

Knowledge engines allow experts to encode rules for programs in a machine-readable way. The various types of rules about a topic define what data is needed under certain circumstances and how to calculate results from that data. These rules can be bundled together into a set of rules that define the module.

However, conventional methods for adding and/or modifying completeness graphs of modules are resource-intensive (e.g., time, money, computing, personnel, etc.) and can require a deep understanding of how to write programming code. For example, when defining a completeness graph by conventional methods, a user must specifically account for each and every way to complete the application, which can implicate millions of options. Consequently, it will not only take the user extreme amounts of time to account for every way, but will in turn lead to extra processing requirements, and thus, power requirements, as more code must be analyzed, more input must be processed, and more processing cycles must be run. Where large and/or complex knowledge engines are used, the computational resources necessary to complete conventional methods is significant.

Therefore, a solution is needed that can overcome the shortcomings of the conventional methods so as to allow for users to more easily define completeness graphs and reduce the processing requirements of executing the completeness graphs.

BRIEF SUMMARY

Certain embodiments provide a method for encoding rules defining a completeness of input. The method generally includes encoding rules defining a completeness of input, comprising: receiving a first input comprising one or more tuples, wherein a tuple of the one or more tuples comprises one or more fields associated with an operation, one or more indicators, and one or more modifiers; receiving a second input associated with the one or more tuples; providing, to a knowledge engine, the first input and the second input; receiving, from the knowledge engine, a result based on the first input and the second input; determining, based on the result, a first symbol associated with a first tuple of the one or more tuples; and displaying the first symbol, wherein the first symbol indicates whether the first tuple is complete.

Other embodiments provide processing systems configured to perform the aforementioned method as well as those described here; non-transitory, computer-readable media comprising instructions that, when executed by one or more processors of a processing system, cause the processing system to perform the aforementioned method as well as those described here; a computer program product embodied on a computer-readable storage medium comprising code for performing the aforementioned method as well as those further described here; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 depicts an example user interface receiving builder input defining a calculation graph of a module.

FIG. 3 depicts an example user interface receiving builder input defining a completeness graph of a module.

FIG. 4 depicts an example user interface displaying one or more symbols associated with runner input, where the runner input contains the required input to complete the module.

FIG. 5 depicts an example user interface displaying one or more symbols associated with runner input, where one or more lists do not need to receive certain input in order for the module to be considered complete.

FIG. 6 depicts an example user interface displaying one or more symbols associated with runner input, where the runner input causes the module to short-circuit.

FIG. 7 depicts an example user interface displaying one or more symbols associated with runner input, where the runner input does not contain the required input to complete the module.

FIG. 8 depicts an example user interface displaying one or more symbols associated with runner input, where an "any of" indicator defines a condition where only one list out of multiple lists must be considered complete for the module to be considered complete.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
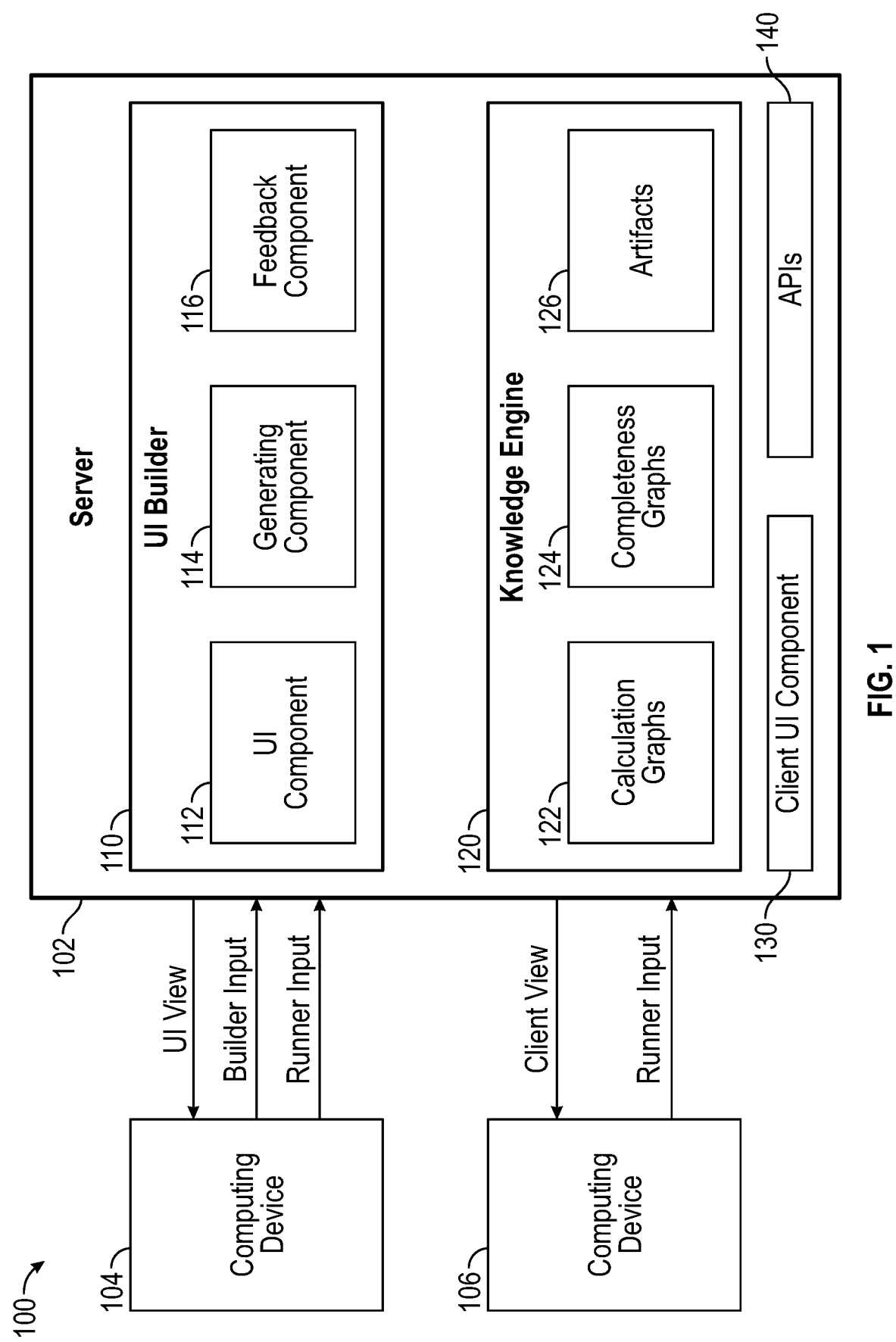
FIG. 1 depicts an example computing environment for defining a completeness graph of a module.

Aspects of the present disclosure provide apparatuses, methods, processing systems, and computer-readable mediums for defining and debugging a completeness graph of a module by using fields within the module and using rules and modifiers to specify which input is required when conditions are satisfied.

A user can define a module that can perform one or more operations, as well as how those operations are completed, by coding rules about the operations and their completeness. For example, certain applications allow users to define calculation graphs and completeness graphs for the module's operations to be executed by a knowledge engine, where the calculation graph is defined as which operations will be performed when the application receives certain data, and the completeness graph defines which of that certain data that the application needs to receive in order to fully execute the operations of the module. When executing the calculation graph and completeness graphs, the knowledge engine takes the rules of the calculation and completeness graphs and applies them to a set of input data to produce a set of results.

By conventional methods, the calculation graphs and completeness graphs would be defined by writing software code, and thus, would require extensive knowledge of coding as well as extensive amounts of time for writing the code. Additionally, to define a completeness graph in such a way would require not only the writer to account for every possible input combination for the operation, which results in more code to be processed in order to run the completeness graph, and thus making defining and using a completeness graph for large operations extremely time consuming and resource intensive. However, a completeness graph that has not been properly defined will cause the module to run improperly, and thus, in order to have a properly working module, a user would need to spend said time and resources. Embodiments described herein leverage the technical capabilities of modern devices to provide an improved method of defining the calculation and completeness graphs for an operation, and therefore overcome the technical and experiential limitations with conventional methods.

Generally, embodiments described herein may leverage various technical capabilities to provide an improved user interface for defining a completeness graph through various elements. In particular, embodiments herein provide a technical solution to the technical problem of increased resource requirements of coding a module, increased processing requirements for performing the operations of a module, and increased processing requirements for processing the completeness graph of the module.

Embodiments described herein may receive, for example, builder input referencing one or more fields of a module and defining conditions of which operational input (called "runner input") to the fields of the module must (or must not) satisfy in order for the module to be considered complete, meaning that all data required to fully process an operation has been provided to the fields of the module. Thus, the user may define the completeness graph with builder input referencing specific fields of the module and choosing other builder input that defines conditions, and running an artifact based on those fields and conditions against the knowledge engine. Beneficially, the user can choose specific indicators and modifiers that define the conditions which allows the server to generate an artifact based on the conditions, allowing the knowledge engine to check the input against the condition instead of checking for every possible input, thus decreasing the size of the artifact than what it would have been if the user writing a code that must account for every possible input. Thus, the processing requirements of generating and executing the artifact are significantly lower than if they were based on other codes due to decreased size, and thus increases the efficiency of the server and knowledge engine as well as decreasing the amount of memory required to generate and execute the artifact.

In these ways and others as described herein, the embodiments herein improve upon conventional methods of defining and implementing completeness graphs by requiring significantly less space and less processing for creating and processing the completeness graphs.

As described in more detail below, receiving builder input referencing fields and defining conditions of completeness not only allows for more efficiently defining the completeness graph but also reducing the processing requirements and saving memory by decreasing the amount of possibilities that the knowledge engine must account for when executing an artifact based on the builder input. For example, the server and knowledge engine allow for a user to debug the completeness graph that has been defined by the builder input to an associated user interface. A user may define the completeness graph by referencing fields and defining conditions through indicators and modifiers input to a user interface, and then may allow the completeness graph to be tested to see if it performs as intended. In doing so, the knowledge engine executes an artifact created by the server based on the user's definition, instead of all possible combinations of input, therefore saving processing power and memory space. The server can then use the knowledge engine's execution to indicate to the user whether the completeness graph performs as intended. Thus, the method of defining a completeness graph described herein allows the server to reduce the processing requirements of each test by only checking whether certain conditions are satisfied and therefore, allowing the server and knowledge engine to run more efficiently than conventional methods allow.

Example System of Computing Devices and Server for Defining Completeness Graphs

FIG. 1 depicts an example computing environment 100 for defining one or more completeness graphs and calculation graphs.

As illustrated, the example computing environment 100 includes a server 102 interacting with computing devices 104 and 106. In this depicted example, the server further includes a module builder 110, a knowledge engine 120, a client UI component 130, and application programming interfaces (APIs) 140. In some embodiments, the knowledge engine may be implemented outside of server 102, such as implemented on multiple devices in a distributed computing environment, or as a cloud service, or the like.

A computing device, such as computing device 104 or computing device 106, can include a computer, laptop, tablet, smartphone, a smart device, a virtual machine, a container, or other types of computing device as are known.

In some cases, the computing device 104 can be associated with a user. The user can, via the computing device 104, input data to define one or more modules (e.g., builder input as described below with respect to FIGS. 2-8). For example, the computing device 104 can access and/or receive UI views from a module builder 110 in a user application and/or an editing application that may receive builder input. In some cases, the UI views may be tabular. In those cases, the UI views may consist of multiple rows and columns containing fields that may receive input data. In other embodiments, the UI views may not be tabular, and may be presented through a graphical editing application. Through the UI views, the user can input the builder input that defines a completeness graph which the server 102 can use to generate an artifact and verify if runner input for performing the one or more defined operations includes the required input necessary to execute the one or more operations. In this embodiment, a computing device sends one or more runner inputs to the server 102. In some embodiments, the computing device 104 may send the runner input to the server 102 for debugging the completeness graph. In other embodiments, the computing device 106 may send input from a client user as the runner input to the server 102. In yet another embodiment, the server 102 may use input stored on the server 102 or otherwise received at the server 102 as the one or more runner inputs.

As shown in this example, the server 102 includes module builder 110, knowledge engine 120, client UI component 130, and APIs 140.

In this depicted example, the module builder 110 includes UI component 112, generating component 114, and feedback component 116.

The UI component 112 may generate UI interfaces that may be provided to one or more computing devices and may receive builder input and/or runner input from the one or more computing devices. The builder input provided may be used to define at least one completeness graph for a module, and may further define at least one calculation graph for the module. Examples of builder input defining the completeness graph are described below with respect to FIG. 3, whereas examples of builder input defining the calculation graph are described below with respect to FIG. 2.

The UI component 112 may additionally contain data related to one or more calculation graphs and/or completeness graphs that can be used to define certain aspects of input to the UI interfaces. For example, the UI component 112 may contain data listing all fields of the module, all indicators, and all modifiers that may be used as input to a UI interface, such as user interface 300 of FIG. 3. In some embodiments, such data may be stored in a network or on a separate server that may be accessed by module builder 110.

The generating component 114 can generate a set of artifact files corresponding to the module (e.g., a "module code") defining the calculation graphs, completeness graphs, and UI views for the module based on the builder input to the module interface. In some embodiments, each of the calculation graph, completeness graph, and client UI view for the module correspond to a respective artifact file. Further, each artifact may be an XML, files, JSON files, or other structured data files. The generating component 114 can further include an algorithm that reviews the builder input to the module interface to create a module code based on the builder input. Each module code or parts of the module code may be stored in the knowledge engine at calculation graphs 122, completeness graphs, 124, and/or artifacts 126. In other embodiments, the artifacts may be stored in a network or another server that may be accessed by server 102 to retrieve artifacts that will be executed by the knowledge engine.

As illustrated, knowledge engine 120 includes calculation graphs 122, completeness graphs 124, and artifacts 126. As previously noted, the knowledge engine 120 may also receive one or more artifact files defining one or more calculation graphs, completeness graphs, and UI views that it may store in artifacts 126. With the artifact files, the knowledge engine 120 may generate and/or update the calculation graphs and completeness graphs which may be stored in calculation graphs 122 and completeness graphs 124, respectively. In some embodiments, the knowledge engine 120 does not update the calculation graphs or completeness graphs, and instead, the module builder 110 updates the artifacts defining the calculation graphs and completeness graphs, which the knowledge engine 120 uses to generate new calculation graphs and completeness graphs. The module builder 110 may have access to the knowledge engine 120 and may retrieve calculation graphs and completeness graphs if needed to define the one or more UI views provided to a computing device, such as computing device 104. In this depicted example, the knowledge engine is part of the server 102. In other embodiments, the knowledge engine may be implemented elsewhere.

As shown in this depicted example, the server 102 further includes client UI component 130. The client UI component 130 may generate one or more client views to provide a computing device, such as computing device 104 or computing device 106. The client UI component 130 may also receive runner input from the computing devices 104. The client UI component 130, after receiving runner input, may provide the runner input to the server 102 so that the server 102 can generate an artifact based, at least in part, the runner input for the knowledge engine 120 to execute against the appropriate calculation graph and completeness graph. The knowledge engine 120 may provide results of executing the artifact against the calculation graph and completeness graph to one or more of the computing devices. The results of executing the artifact against the calculation graph would indicate specific calculations made based on the received runner input and operations associated with the calculation graph. The results of executing the runner input against the completeness graph would indicate if the received runner input contained all input required in order to complete the operation of the module.

Server 102 further includes APIs 140, which may be used by the server 102 in order to determine if the module has been properly defined. In some embodiments, a user can call one or more APIs of APIs 140 corresponding to a particular artifact file of the module code in order to cause knowledge engine 120 to execute the artifact file (e.g., calculation graph, completeness graphs, and/or a client UI view) based on received runner input. In some embodiments, an API can cause the knowledge engine 120 to run the calculations of the calculation graph based on runner input, cause the knowledge engine 108 to run the completeness graph to make sure all required runner input was input to the collection interface, and/or cause the knowledge engine 108 to display an associated client UI view to the user. In another embodiment, an API can cause the module builder 110 to generate client UI views after the executing certain artifact files. The server may receive a result based on that execution and display one or more symbols based on that result, so that the user can debug a completeness graph. In some embodiments, the explanation may be further defined by input received at the server 102. By running the APIs, the user can make sure that all desired rules and regulations of the module collection have been implemented and all necessary data has been input.

Example User Interface for Defining a Calculation Graph of a Module

FIG. 2 depicts an example user interface 200, which is one of the UI views that may receive builder input for defining a calculation graph of a module or runner input to test that calculation graph. In some embodiments, the user interface 200 is provided by a server, such as server 102 of FIG. 1, to a computing device, such as computing device 104 of FIG. 1.

As illustrated, this particular user interface 200 includes a tabular interface for a user to enter builder input regarding a calculation graph (e.g., how to perform a new and/or modified operation) of the module or the runner input to test the module. User interface 200 includes one or more tuples, such as a particular set of user interface elements (e.g., a set of cells), that may receive builder input. Input to each tuple may define a node of the knowledge graph and/or an operation associated with the node. In this depicted example, the tuples may be columns of cells and rows of cells, however, columns of cells and rows of cells are exemplary tuples, and other tuples may be used in other embodiments. For example, each column of the user interface may have a textual description of the data contained in the column (e.g., "role" and "type"). Each row can receive builder input representing a description of a respective node in the calculation graph or an operation to be performed by the node. Together, the rows represent multiple nodes of the calculation graph that will perform one or more operations to generate a result.

For example, a user can input builder data (e.g., "builder input") to a first cell (e.g., cell 214) in a first row to define a first node with a node description of "User Name" (e.g., as input by the user to cell 218), and builder input to a second cell (e.g., cell 216) in the first row to include in the description the type of data (e.g., "string", "decimal", "checkbox", or "date"), to be entered in a UI view. The user may additionally input a field name (e.g., "Name") for the first node in cell 220, which may further be used when inputting information defining the completeness graph, as described with respect to FIG. 3. The field name may refer to a field of the module that may receive test data input (e.g., "runner input") in order to perform an operation of the module. Lastly, the user interface 200 may receive runner input to be run against the calculation graph, such as data related to the node (e.g., "John Smith" in cell 222).

In some embodiments, the builder input may be chosen from a dropdown menu or may be typed in by the user. In other embodiments, certain cells may be automatically filled in by the server and cannot receive user input. In some embodiments, the runner input may be typed into an appropriate cell of the user interface 200.

The user may further input data to the remaining fields in the user interface (e.g., the remaining fields in set of cells 204, set of cells 206, set of cells 208, set of cells 210, and set of cells 212), where each row of the remaining cells corresponds to a node in the calculation graph. The server may then generate an artifact file defining the calculation graph, which may be used to execute the builder input and runner input to user interface 200 against a knowledge engine, such as knowledge engine 120 of FIG. 1.

In some embodiments, the builder input to user interface 200 may be stored by the server, and later accessed by the server (e.g., by UI component 112), in order to define other user interfaces of the module, such as user interface 300 of FIG. 3.

Example User Interface for Defining a Completeness Graph of a Module

FIG. 3 depicts an example user interface 300, which is one of the UI views that may receive builder input for defining a completeness graph of a module. In some embodiments, the user interface 300 is provided by a server, such as server 102 of FIG. 1, to a computing device such as computing device 104 of FIG. 1.

As shown, the user interface 300 is tabular and has one or more tuples of cells that may receive builder input defining the completeness graph of the module. Similarly to user interface 200, the tuples in this depicted example are rows and columns, however, rows and columns are exemplary, and other types of tuples may be used. In other embodiments, the user interface may be a graphical user interface or a user interface that receives plain text using a domain specific language. After receiving builder input to at least one cell, the server may create an artifact based on the builder input that may be executed by the knowledge engine in order to determine the completeness of input to the module. For example, in some cases, a user may define the completeness graph by using builder input related to the input to another user interface view, such as the user interface 200 of FIG. 2, and the server may use the builder input to user interface 300 to create an artifact that may be run against the knowledge engine. In some embodiments, the server may create and run the artifact against the knowledge engine through an API (e.g., an API of APIs 140), which in some cases may be done in response to a user selection. Additionally, the server may also receive builder input for debugging the module or client input to the fields of the module in order to determine the completeness of input, which an artifact may further be based on.

Each column may be associated with a type of data of the builder input. For example, a set of cells may cover input required for the entire module to be complete or for a subset of the module, called a "list" of fields, to be complete (e.g., cells in column A having data referencing a field of the module, a specific set of fields referenced by a list, or the entire module). As another example, a set of cells may contain references specific fields or specific lists (e.g., cells in column B receiving builder input to each cell of set of cells 308, set of cells 314, and set of cells 320 referencing specific fields of the module, as well as set of cells 304 and set of cells 306 defining lists). Further, a set of cells may include one or more indicators denoting whether there is a condition associated with a field in the same row and when that condition needs to be satisfied (e.g., cells of column C having data indicating whether or not a field must always receive input in set of cells 310, set of cells 316, and set of cells 322). Also, certain cells may also receive a modifier defining the condition for the field in the same row (e.g., cells in columns D-G defining conditions of when a field must receive input, such as set of cells 312, set of cells 318, and set of cells 324). Thus, together, a combination of one or more indicators and modifiers may define a condition and when that condition applies.

In FIG. 3, the cells of row 3 receive builder input to each of cells 3B-3F defining when a field (e.g., cell 3B defining the "Email" field of the module "Legal Age") requires input for the module to be considered complete. More specifically, cell 3B of row 3 denotes the field of the module (e.g., "Email", corresponding to a field in set of cells 220 as described with respect to FIG. 2), cell 3C of row 3 denotes that the "Email" field "MUST BE ASKED WHEN" a condition is satisfied, where the condition is defined by cells 3D-3G of row 3 (e.g., when the "Name" field in set of cells 220 did not receive corresponding input, and therefore is "UNKNOWN").

As noted above, rows of user interface 300 may also receive builder input indicating that the entire module or a certain list of the module is required to receive runner input in order for the module to be completed. For example, set of cells 302 corresponding to row 1 (also referred to as "module row 302") defines that the entire module named "Legal Age" is complete when all of the fields defined by set of cells 308 receive input, based on whether conditions defined by indicators in set of cells 310 and modifiers in set of cells 312 are satisfied.

Similarly, builder input to the rows may define that one or more fields referenced by one or more lists are required to receive runner input in order for the list to be completed based on whether certain preceding conditions are satisfied. For example, set of cells 304 corresponding to row 10 (also referred to as "list row 304") may receive builder input that defines that the "Parent" list is required to receive runner input to each referenced field in the list, as defined by set of cells 314, in order for the list to be completed, subject to conditions defined by an indicator of cell 10C and modifiers of cells 10D-10G. Additionally, the rows corresponding to the list may have their own cells of fields, indicators, and modifiers that define when the fields of the rows must receive runner input. For example, row 13 may receive input defining that the "Parent" list is complete when the field referenced by cell 13B ("Psign") receives input, subject to certain conditions defined by the indicators in set of cells 316 and the modifiers in set of cells 318. In certain embodiments, when defining a list, no indicators or modifiers are necessary to define a condition for the list, and instead, may be defined in the cell referencing the list. For example, in those embodiments, cell 10A may receive builder input defining that all of the referenced fields of the list must receive runner input (e.g., cell 10A would receive builder input showing "List—All of") or alternatively, that only one of the referenced fields of the list must receive runner input (e.g., cell 10A would receive would receive builder input showing "List—Any of"). After defining the fields of a list, builder input referencing the list may be input to certain cells (e.g., cells 6B and 7B). Thus, lists may be used as builder input to define when other lists or the module may be complete, which allows the module or lists to be broken up into logical chunks.

As an additional example, the user interface 300 may receive builder input that defines that the "Guardian" list, as denoted by input to cell 17B, requires runner input to each referenced field of the list defined by set of cells 320, in order for the list to be completed, where the input must be received subject to certain conditions as defined by the indicator of cell 17C and modifiers of cells 17D-17G.

Thus, the builder input to the cells of user interface 300 defines when certain fields of the module as defined in user interface 200 of FIG. 2 must receive runner input, and may define that certain fields must receive input subject to not only the conditions defined in the row referencing the field, but other conditions as well. In doing so, the builder input may link certain fields or lists together, making certain fields only require runner input when multiple conditions are satisfied.

For example, in order for row 21 to be considered complete, the field referenced by input to cell 21B (e.g., "Gday") of row 21 must receive runner input based on the condition defined by the indicator of cell 21C and modifiers of cells 21D-21G. However, row 21 is within the "Guardian" list as defined in row 17, and thus, "Gday" must also receive runner input for the condition defined by the indicator of cell 17C and modifiers of cells 17D-17G to be satisfied. Additionally, the "Guardian" list is also input to set of cells 308, and thus, for the "Legal Age" module to be considered complete, the fields defined by the "Guardian" list (e.g., fields input to set of cells 320) must only receive input if the condition defined by the indicators of cells 7C and 8C and modifiers of cells 7D-7G and 8D-8G is satisfied.

In this way, a user may use builder input defining when a module has received the necessary input subject to certain indicators and identifiers, which may include defining when one or more lists or fields have received the necessary input as well.

Referencing Fields within the Module

The builder input to each cell in set of cells 308, set of cells 314, and set of cells 320 may reference one or more fields (as defined in user interface 200 of FIG. 2) of the module that require runner input, subject to certain conditions associated with the row that references the field, as described below. The input to a cell may reference a field of the module (e.g., "Name", "Email", "Bday", etc., as defined by set of cells 220 of FIG. 2). In this depicted example, a field of the module that requires input may be defined by a user in a separate user interface view, as described with respect to user interface 200 of FIG. 2.

The builder input to one or more cells may further indicate what fields of the module must receive runner input in order for the module itself to be considered complete. Like the lists, the module itself may be indicated in its own row of cells (a "module row"), for example, module row 302 for the "Legal Age" module. In some embodiments, the module or list names may be defined by text input of the user. In some embodiment, like the other rows, module row 302 may receive builder input defining its own condition through indicators and modifiers (e.g., the indicator of cell 1C and the modifiers of cells 1D-1G), meaning that the module may only be considered complete when the condition is satisfied. In other embodiments, the module row 302 may not receive any builder input defining its indicators and modifiers, and may instead be complete when all referenced fields have received input if the associated conditions are satisfied. In this depicted example, the fields that must receive input for the module to be complete are shown as the cells directly beneath the row defining the module (e.g., the "Legal Age" module indicated by module row 302 receives input that certain fields of the module defined by set of cells 308 must receive runner input for the "Legal Age" module to be complete, subject to conditions defined by associated indicators and modifiers).

The builder input to one or more cells may further define a list of fields of the module (e.g., "List-Parent" and "List-Guardian"). The cells defining a list of fields of the module may receive builder input referencing one or more fields of the module that must receive runner input in order for the list to be complete, based on whether condition(s) of the row referencing each field are satisfied. Additionally, the list itself may be indicated in its own row of cells (a "list row"), for example, list row 304 for the "Parent" list or list row 306 for the "Guardian" list. Like other rows, the cells of the row that indicates the list may receive builder input defining indicators and modifiers of the row. In this depicted example, the fields of the list are defined by the cells directly beneath the list row (e.g., the "Parent" list indicated by row 304 includes all fields defined by builder input to the set of cells 314). In other embodiments, the fields of the list may be defined in a separate user interface view or may be in a separate location within the user interface 300.

After a list is defined within user interface 300, for example, by list row 304 and set of cells 314 along with the corresponding indicators and modifiers, the list may be referenced like a field of the module by builder input to other cells of user interface 300. For example, the set of cells 308 includes cell 6B, which corresponds to the "Parent" list. Thus, in order for the "Legal Age" module to be considered complete, the "Parent" list must also be considered complete, based on the conditions associated with row 1 (defining when the entire "Legal Age" module is complete), row 6 (defining when the "Parent" list specifically must be completed for the "Legal Age" to be complete), row 10 (defining when the entire "Parent" list is complete), and the rows 11-15 (defining when each field defined by the set of cells 318 must receive for the "Parent" list to be complete).

In this depicted example, the fields that must receive runner input are defined input to a drop down menu. For instance, in response to a user selection, a cell in the set of cells 308, set of cells 314, or set of cells 320 may display a drop down menu of all available fields and lists to receive runner input (e.g., all fields defined by the set of cells 220 as described with respect to FIG. 2 as well as lists defined in user interface 300). In other embodiments, text input to cells corresponding to one or more of the available fields may be used to indicate which fields must receive runner input.

Further, in this depicted example, there is no limit to the amount of times a certain field chosen from the available fields may be used in defining the completeness of the module or lists of the module. For example, the field "Psign" as indicated by builder input to cell 13C must receive runner input for the "Parent" list to be completed, however, the user could also define other lists that required Psign to receive runner input in order for the list to be completed.

Indicators Labelling Fields in the User Interface

In FIG. 3, rows reference fields of the module through input to cells in the set of cells 308, set of cells 314, and set of cells 320 may be considered complete subject to conditions defined in part by indicators input to cells of the set of cells 310, set of cells 316, and set of cells 322, respectively. An indicator defines when a field referenced in a cell of the same row or a corresponding row must receive runner input based on whether a condition defined by the corresponding modifiers of the same row is satisfied. For example, the field "Email" as defined by cell 3B must receive runner input only in certain circumstances as defined by the indicator of cell 3C for the module to be considered complete.

In this depicted example, each row contains an indicator (e.g., input to a corresponding cell in column C) corresponding to the field referenced by the builder input. Further, in this depicted example, the indicator of each cell in set of cells 310, set of cells 316, and set of cells 322, is defined whether or not the cell receives input. For example, if a cell receives builder input, the indicator is defined by that input, but if the cell does not receive input, the indicator becomes a default indicator (a "blank indicator") in this example. In other embodiments, rows may not require input to a cell defining an indicator corresponding to the referenced field. In another embodiment, the cells must receive input in order to define the indicator of the cell.

In some embodiments, the indicator may be chosen from a set of indicators. For example, an indicator may be "WHEN" as shown by indicator of cell 6C, or may be "MUST BE ASKED WHEN" as shown by indicator of cell 3C. Additional examples of indicators in the set of indicators include "MUST BE ASKED", "is complete when", and a blank indicator.

The "WHEN" indicator indicates that, for a module or list referencing a corresponding field to be considered complete, the referenced field requires runner input only "WHEN" the condition defined by corresponding modifiers is satisfied. Thus, in this depicted example, the "Legal Age" module will only be considered complete "when" the "Parent" list as defined by cell 6B receives required runner input, as long as the condition defined by the modifiers of cells 6D-6G is satisfied.

The "MUST BE ASKED WHEN" indicator indicates that, for a module or list referencing a corresponding field to be complete, the referenced field must be presented to a user when the condition defined by the corresponding modifiers is satisfied. Thus, in the depicted example, the "Legal Age" module will only be considered complete when the "Email" field, as referenced by cell 3B, is displayed to a client user when the condition defined by the modifiers of cells 3D-3G is satisfied. In some embodiments, the corresponding field may be complete even when the referenced field does not receive any runner input from the user.

The "MUST BE ASKED (BLANK IS ALLOWED)" indicator indicates that a referenced field must be displayed to a client user in all cases. The field corresponding to the indicator will be considered complete as long as the referenced field is displayed, regardless of whether the referenced field receives runner input.

The "is complete when" indicator indicates that a module or list associated with the indicator is complete only when referenced field or fields receive input, as long as the conditions defined by the modifiers associated with those certain fields are satisfied. In some embodiments, a blank indicator may also indicate that a module or list associated with the indicator is complete only when referenced field or fields receive input, as long as the conditions defined by the modifiers associated with those certain fields are satisfied.

In this depicted example, the blank indicator indicates that either no builder input was received at the cell or the builder input to the cell indicated a blank indicator. The blank indicator further indicates that the referenced field always requires input for the field, list, or module, regardless of any conditions defined by the modifiers associated with the certain field. In this depicted example, the "Name" field defined by cell 2B is associated with a blank indicator input to cell 2C, indicating that the "Name" field must always receive input for the "Legal Age" module to be complete, regardless of if any conditions are defined by the modifiers of cells 2D-2G. In some embodiments, if the modifiers of cells 2D-2G are not blank modifiers but the indicator of cell 2C is a blank indicator, the server may display an error message indicating that the user should adjust the current builder input.

A field associated with a blank indicator may not require builder input for the entire module to be complete if the list referencing the field is not required to be complete. For instance, in this depicted example, the "Parent" list only requires certain input "when" the condition defined by modifiers input to cells 6D-6G is satisfied. Further, fields referenced by the "Parent" list are also associated with a blank indicator (e.g., in cell 11C). Thus, if the "Parent" list does not need to be considered complete for the module to be considered complete, the fields referenced by the list that are associated with the blank indicator may not require input for the "Legal Age" module to be complete.

In some embodiments, a referenced field may be associated with two or more conditions. In those embodiments, the field may require runner input only if one condition of the two or more conditions is satisfied or all conditions of the two or more conditions are satisfied, as described below.

A user may input an indicator to a cell through a selection to drop down menu. For instance, in response to a user selection, an indicator input to the set of cells 310, set of cells 316, or set of cells 322 may display a drop drown menu of all available indicators to receive builder input. In other embodiments, text input to the cells may be used to define which indicators are input to the cells.

Further, in this depicted example, there is no limit to the amount of times a certain indicator may be used when defining the completeness of a module or lists of the module.

While certain indicators may be shown and defined in this depicted example, those indicators are exemplary, and other indicators may be used when defining a completeness graph.

Modifiers Defining Conditions for when Referenced Fields Must Receive Input

In FIG. 3, the builder input to cells in the set of cells 308, set of cells 314, and set of cells 320, referenced fields that must be complete when conditions as defined by builder input to cells in the set of cells 312, set of cells 318, and set of cells 324 are satisfied. One or more modifiers input to cells define a condition of a row referencing a corresponding field. For example, the field "Email" as defined by cell 3B must be presented when the "Name" field equals "UNKNOWN" (as shown by modifiers in cells 3D-3F) in order for the module to be complete.

In this depicted example, certain cells of each row receive certain modifiers as builder input corresponding to the field and the indicator of the row. Further, in this depicted example, the modifiers input to the cells of a row define a condition that, in conjunction with the indicator of the row, indicates when the field associated with the row must receive runner input. For example, the fields associated with the "Parent" list, as referenced by input to cell 6B, must only receive runner input "when", as defined by the indicator of cell 6C, the condition of defined by modifiers of cells 6D-6G. However, when the condition defined by the modifiers is not satisfied, the indicator does not apply, and the referenced field or fields do not require runner input for the module to be considered complete. Further, in this depicted example, the condition defined by the input to cells 6D-6G shows that the indicator is only applicable when the value associated with the "Age" field of the module "is less than" "18". Thus, "when" the value associated with the "Age" field is "less than" "18", as defined by the modifiers of cells 6D-6G and the indicator of cell 6C, the field (e.g., the "Parent" list) of the module referenced by cell 6B will require input. Alternatively, "when" the value associated with the "Age" field is not "less than" "18", the "Parent" list does not need to be complete for the module to be considered complete. In other embodiments, the values of specific modifiers may be defined in another interface and referenced in user interface 300. For example, instead of the modifier "18" in cell 6F, the modifier "AdultAge" could be used in cell 6F, where "AdultAge" may be defined as a constant in user interface 200.

A modifier may be chosen from a set of modifiers. Further, there may be multiple types of modifiers.

A first type of modifiers may correspond to fields of the module, such as fields referenced in set of cells 210 as described with respect to FIG. 2 (e.g., the "Age" field as input to cell 6D). A second type of modifiers may correspond to operators, such as operators determining if one value "IS LESS THAN", "IS GREATER THAN", "EQUALS", "DOES NOT EQUAL", "IS LESS THAN OR EQUAL TO", or "IS GREATER THAN OR EQUAL TO" another value. While the text describing the operators have been described above, the equivalent mathematical symbols may also be input as a modifier.

A second type of modifiers may further include operators determining if one value is "ONE OF" an array of values, is "NOT ONE OF" an array of values, or is a blank or unknown value.

A third type of modifier may define a value to which another value needs to be compared. In some embodiments, the value of the field may be defined by runner input to a referenced field. The value may be a numerical value, a string value, a Boolean value, or another type of value.

A fourth type of modifier indicates whether certain conditions associated with the referenced field must be satisfied. For example, the fourth type of modifier may be "and", as shown by modifier of cell 7G in this depicted example, indicating that both a first condition defined at least in part by builder input to cells 7D-7F "and" a second condition defined by the builder input to cells 8D-8F must be satisfied in order for the corresponding field to require input. In another example, the fourth type of modifier may be "or", indicating that either a first condition "or" a second condition must be satisfied in order for the referenced field to require runner input in order to be considered complete. In this depicted embodiment, only two conditions are linked by the "and" modifier input to cell 7G. In other embodiments, any number of conditions may be related by the "and" or "or" modifiers. For example, a set of conditions within parentheses may be linked by "and" modifiers, and those conditions within the parenthesis may be separated from another condition or a set of conditions by "or" modifiers, so that only one set of conditions must be satisfied in order for the referenced field to be considered complete.

Certain types of modifiers may further correspond to conditions defining when a referenced module or a list of fields is complete.

For example, a fifth type of modifiers may include the "all of" modifier, which indicates that a module or list is complete when "all of" the listed fields corresponding to the module or list receive runner input, as long as the corresponding conditions associated with the fields are satisfied. In this depicted example, modifiers of cells 1D, 10D, and 17D show that all fields listed below require input subject to indicators and modifiers for the "Legal Age" module, the "Parent" list, and the "Guardian" list, respectively. Alternatively, the fifth type of modifiers may also include the "any of" modifier, which indicates that a module or list is complete when only one of the referenced fields corresponding to the module or list receives runner input, as long as the corresponding conditions are satisfied (as shown by cell 11F of FIG. 8).

Additionally, a sixth type of modifier may also correspond to conditions defining when a referenced module or a list of fields is complete. For example, the sixth type of modifier may include the "these are complete" modifier, as shown in modifiers of cells 1E, 10E, and 17E, which indicates that a module or list is complete when all of the fields listed for the module or list receive input, as long as the corresponding conditions are satisfied. In some embodiments, a blank modifier in column E may also indicate that a module or list is complete when all of the fields listed for the module or list receive input, as long as the corresponding conditions are satisfied.

While certain modifiers may be shown and defined in this depicted example, those modifiers are exemplary, and other modifiers may be used when defining a completeness graph.

Thus, the combination of the indicators and the modifiers for each row defines when corresponding fields must receive input in order for certain modules or lists to be considered complete.

Short-Circuit Cells

The builder input defining the completeness graph of a module may cause the module or list to "short-circuit", meaning that the knowledge engine executing the completeness graph does not need to evaluate the rest of the runner input to fields of the module or list.

In FIG. 3, cell 5B displays "THIS LIST WILL SHORT CIRCUIT" subject to whether an associated condition is satisfied. Therefore, in the depicted example, the list will short-circuit if the condition defined by the modifiers is satisfied, and thus, if the knowledge engine evaluates row 5 and determines that the condition defined by modifiers 5D-5G is satisfied, the knowledge engine will short-circuit the module and consider it complete regardless of the required runner input of to the fields referenced by rows that have not yet been evaluated. Thus, if the knowledge engine short-circuits evaluating the module at row 5, the knowledge engine will not need to further evaluate the runner input to fields corresponding to fields referenced by cells 6B and 7B. In some embodiments, the knowledge engine may continue to evaluate the input to rows or lists that have not yet been evaluated, and provide results indicating if the row, list, or module would have been complete if the knowledge engine had not short-circuited. In other embodiments, the knowledge engine may stop evaluating the module or list and will not provide results based on the unevaluated lists, thus saving time and processing power because it has not been required to evaluate the extra input. For instance, in those embodiments, if the module itself short-circuits before a list is evaluated, the entire list may not be evaluated at all by the knowledge engine.

In some embodiments, the rows with conditions associated with short-circuiting are evaluated before the other rows within a corresponding list or module. In those embodiments, if the list or module short-circuits because the condition is satisfied (or not satisfied), the knowledge engine does not evaluate any other rows of the list or module, and thus, saves times and processing power by evaluating fewer rows than normally required.

Additionally, a seventh type of modifier may correspond to a condition defining that a referenced field must receive required runner input when a module or list short-circuits or does not short-circuit. For example, the condition defined by the modifier may only require that a first list receives input to corresponding fields if a second list has short-circuited, or alternatively, not short-circuited, for the module to be considered complete. Thus, the builder input may define conditions that make a first list or the module short-circuit based on if a second list has short-circuited.

Thus, when a referenced field receives or does not receive certain runner input, the knowledge engine may short-circuit evaluating the module or list, thereby saving time and processing power by only evaluating a portion of the input when determining completeness of the input.

Dead-Ends Occurring when a Field does not Receive Required Input

In some embodiments, when debugging the module or evaluating runner input, the knowledge engine may "dead-end" evaluating the module in response to the runner input. "Dead-ending" occurs when the knowledge engine has partially evaluated the runner input and determined that a module or list cannot be completed due to runner input to one field or a value associated with that field, regardless of runner input to other fields. For example, a dead-end may occur if input to a cell in a row references "THIS LIST WILL ONLY BE COMPLETE" when a corresponding condition of the row is satisfied, but the runner input does not satisfy the condition. Thus, no matter what other input may be required for the list or module to be complete, the list or module cannot be completed, and the list or module will dead-end.

Therefore, in this depicted example, dead-ending would occur if runner input to the fields of the module caused the value associated with the "Page" field to be less than "18".

Since the condition of row 15, which is associated with the "Page" value, would not be satisfied, the "Parent" list could never be complete, regardless of runner input to the other referenced fields. Thus, the "Parent" list would dead-end. In some embodiments, when the knowledge engine determines that a list or module dead-ends, it does not evaluate the other referenced fields of the list or module, and returns a result indicating that it did not evaluate those other referenced fields.

Thus, by inputting certain fields, indicators, and modifiers to the cells of the user interface 300, a user may define the required runner input for a module to be completed. The combination of the indicators and the modifiers may define conditions that determine exactly when fields require runner input or do not require runner input, when a list or module will short-circuit, and when a list or module may dead-end. Further, lists of fields may be defined by the user, which may have associated conditions of their own defining when the lists need to be receive required runner input. After receiving all of the builder input defining the completeness graph, the server may create an artifact based on the builder input and run the artifact against the knowledge engine when determining if the runner input completes the module.

Debugging a Module Based on the Fields, Indicators, and Modifiers and Debugging Input With the user interfaces associated with the module, a user may input (1) builder input defining the calculation graph, such as the input to user interface 200 of FIG. 2, (2) builder input defining the completeness graph, such as the input to user interface 300 of FIGS. 3, and (3) runner input used to test the completeness of the module based on the runner input and the builder input defining the completeness graph, such as described below with respect to FIGS. 4-8. The runner input used to test the completeness graph may be input in a user interface for defining the calculation graph, such as user interface 200, a user interface for defining the completeness graph, such as user interface 300, or a separate user interface. Runner input may be considered any input to a field of a module that is used or referenced when executing one or more operations of the module. In some embodiments, the runner input may be input to a user interface associated with the module (e.g., user interface 200 or user interface 300) for debugging the module. In other embodiments, the runner input may be input to a user interface displayed to a user on a client device.

Based on the builder input defining the completeness graph and the runner input to the fields of the module, a server, such as server 102 of FIG. 1, may create an artifact to execute against a knowledge engine, such as knowledge engine 120 of FIG. 1. The artifact may then be executed against the knowledge engine, which may return a result based on the completeness of the module with respect to the builder input defining the completeness graph and runner input, as described with respect to FIG. 1.

Based on the result of the completeness of the builder input, the server may display one or more symbols associated with the completeness of one or more the rows in the user interface by determining if a referenced field, list, or module is complete based on if runner input satisfied an associated condition. Each symbol may indicate one or more aspects associated with the completeness of a tuple of input.

Figure 4:
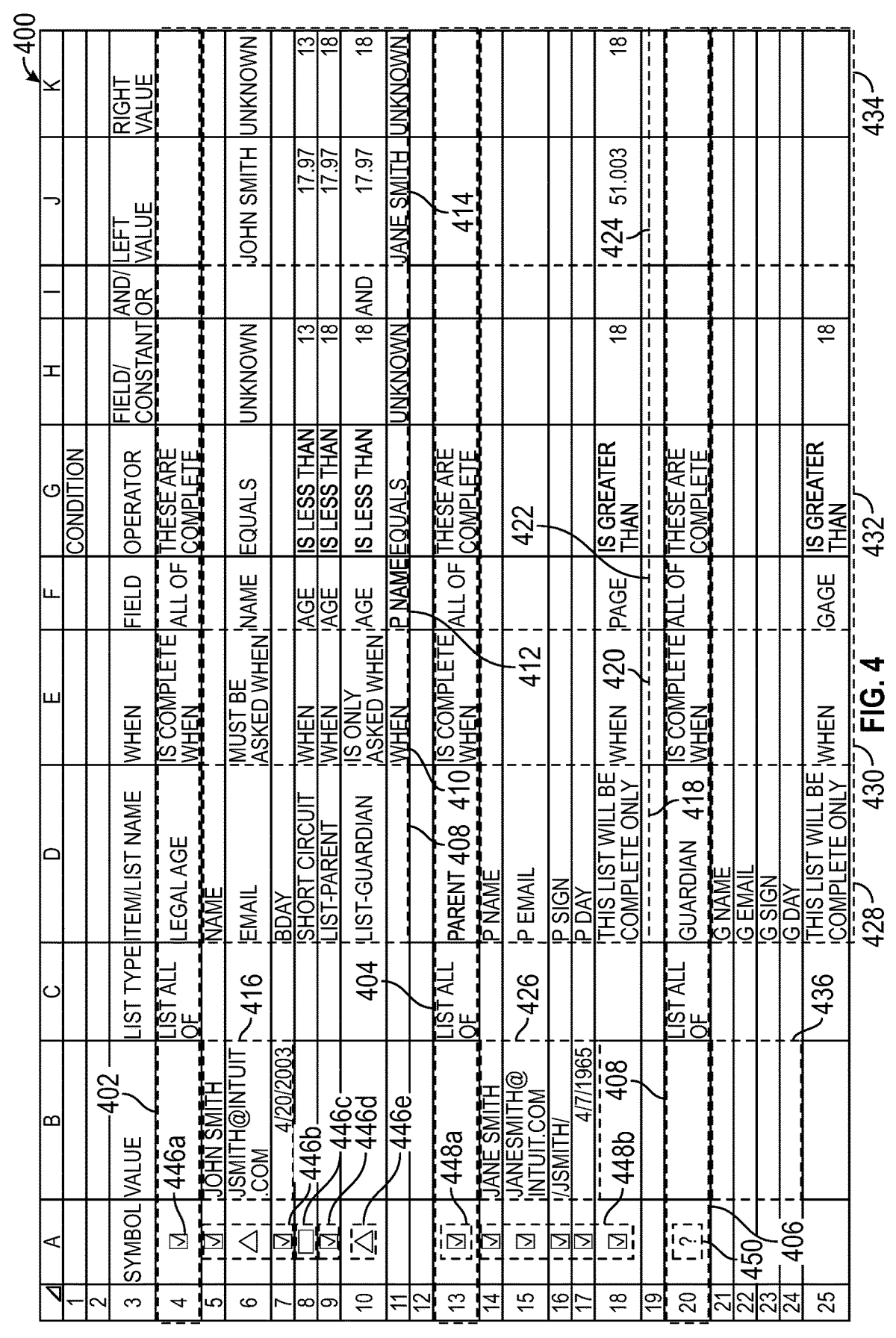

In order to communicate the aspects associated with the completeness of the module, the server may display the symbols (e.g., such as symbols 446a, 446c-e, 446a, and 450 and sets of symbols 446b and 448b of FIG. 4) in the user interface that received builder input with extra rows and columns for displaying the symbols and runner input. For example, user interface 300 of FIG. 3, which received the builder input, may display extra rows and columns with the symbols and runner input in order to show the one or more aspects that were determined. Thus, the symbols and runner input may be displayed in the same user interface that received the builder input (e.g., as described with respect to user interface 400 of FIG. 4, user interface 500 of FIG. 5, user interface 600 of FIG. 6, user interface 700 of FIG. 7, and user interface 800 of FIG. 8). The rows may further be highlighted with a color of a plurality of colors, where the highlighted color of the row is associated with the symbol displayed for the row.

In some cases, the extra rows and columns with the symbols and runner input may be displayed in response to a user request received by the server. Further, in those cases, the extra rows and columns may be hidden in response to another user request received at the server. In other embodiments, the symbols and runner input may be displayed in an entirely separate user interface or user interface view.

As noted above, the user interface may display one or more symbols associated with the completeness of the one or more tuples, which indicate the completeness of an associated field, list, or module. In the embodiments described below, the tuples are rows of cells of a user interface. In other embodiments, the tuples may be a different type of container, such as a column of cells, a box of cells, or another arrangement of cells. In another embodiment, the tuples may not include cells and may comprise certain a graphical arrangement. In other embodiments, the tuples may be defined in a text interface.

The symbols may further indicate one or more aspects of corresponding fields, lists, or modules based on the builder input and the input defining the completeness graph, and may be displayed next to a row associated with that aspect and corresponding field, list, or module. For example, the symbols may indicate that the runner input to the field referenced by the row is complete because the runner input satisfies a condition of the row, as described with respect to FIGS. 4-8, or may indicate that a row is not complete because the runner input to a field reference in the row does not satisfy the condition of the row, as described below with respect to FIGS. 5-8.

As another example, the symbols may indicate whether a module or list referenced by the row has short-circuited based on whether the runner input associated with the module or list satisfies the condition of the row, as described below with respect to FIGS. 4-8, and may also indicate if a first row is considered complete due to a short-circuit regardless of runner input to a referenced field, as described further below with respect to FIG. 6. The symbols may also indicate whether a row is complete based on whether a field, list, or module was not evaluated due to a dead-end, as described with respect to FIG. 7, or may indicate whether a first row is considered complete because the row did not need to be evaluated based on a satisfied condition of a second row, as described further below with respect to FIGS. 5 and 8.

The server may analyze the result returned by the knowledge engine and determine symbols to display based on the completeness of the runner input and the one or more aspects in order to help the user determine whether to adjust the builder input, the runner input, or both. In some cases, after displaying the symbols indicating the completeness of the module, the server may receive new builder input or new runner input. In response to a user request received through an interface element, the server may generate an artifact based on the new input and receive a new result from the knowledge engine, and may update what symbols are displayed in the interface. It should further be noted that the aspects determined and symbols as described with respect to FIGS. 4-8 are exemplary, and other aspects and symbols may be determined and shown.

Even further, in order to determine if the runner input completes the fields, lists, or module, the server may use an API (e.g., an API of APIs 140 of FIG. 1) in order to provide the artifact generated based on the builder input and runner input to the knowledge engine. An API may further return the result indicating the completeness and one or more aspects from the knowledge engine to the server.

Example Debugging a Module that has Received the Required Input

FIG. 4 depicts an example user interface 400 displaying one or more symbols based on the results of executing an artifact based on the builder input defining a completeness graph, such as the builder input to user interface 300 of FIG. 3, and runner input to the fields of the module, that may be input to a user interface such as user interface 200 of FIG. 2. For example, the runner input may be based on input data to the set of cells 212 of FIG. 2.

In this depicted example, based on the result of the completeness of the builder input returned by the knowledge engine, the user interface 400 displays one or more symbols (e.g., such as symbols 446*a*, 446*c-e*, 446*a*, and 450 and sets of symbols 446*b* and 448*b*) associated with the completeness of one or more rows 1-25. The rows of user interface 400 may correspond to the rows of other user interfaces, such as user interface 200 and/or user interface 300. In this depicted example, the row 5 references data from row 2 of user interface 200, where the field of the module (e.g., the "Name" field) is defined, and row 2 of user interface 300 where the completeness requirements for the field are defined.

Additionally, some rows of user interface 400 refer to specific lists of the module that are defined in another user interface, such as user interface 300. In this depicted example, row 4 refers to the "Legal Age" module defined by row 1 of user interface 300 (e.g., module row 302 of FIG. 3), and further includes the corresponding indicators and modifiers. Additionally, row 13 refers to the "Parent" list defined by row 10 of user interface 300 (e.g., list row 304 of FIG. 3), and further includes the corresponding indicators and modifiers. Even further, row 20 refers to the "Guardian" list defined by row 17 of user interface 300 (e.g., list row 306 of FIG. 3), and further includes the corresponding indicators and modifiers.

The symbols 446*a*, 446*c-e*, 446*a*, and 450 and sets of symbols 446*b* and 448*b* are determined by the server based on the result of executing an artifact against a knowledge engine, such as knowledge engine 120 of FIG. 1, where the artifact is based on the completeness of runner input (e.g., the input data to set of cells 220 of FIG. 2) as defined by the builder input defining the completeness graph (e.g., the input data to user interface 300). For example, the server may determine the symbols based on a table mapping portions of a result to certain symbols. Thus, the knowledge engine checks to see if the one more fields, lists, and modules referenced by the rows are complete by executing the artifact. In this depicted example, the knowledge engine would start by checking to see if the "Legal Age" module of as referenced by row 4 is complete by checking if the runner input satisfies the conditions of the rows 5-11. In doing so, the knowledge engine may check if the referenced fields and lists associated with the module, such as the fields and lists referenced by the builder input to set of cells 408, are complete. In some cases, this requires the knowledge engine to evaluate a list with respect to more than one condition associated with the list. Thus, in this depicted example, the "Parent" list of row 9 only needs to be evaluated when the runner input causes the "Age" value to be "less than" "18"; however, if the runner input causes the "Age" value to be "less than" "18", the knowledge engine must evaluate the completeness of the "Parent" list. In those cases, the "Parent" list "is complete when" "all of" its referenced fields (e.g., as defined by set of cells 418) receive runner input, as long as the conditions defined by the indicators (e.g., as defined by set of cells 420) and modifiers (e.g., as defined by set of cells 422) that are associated with the rows are satisfied.

In this depicted example, the symbol 446*a* indicates that the runner input to the fields associated with the rows 5-11 contains the required input because the runner input satisfies certain condition of the rows 5-11, and therefore, each row is considered complete. Thus, the server determined that, based on the result of the knowledge engine, the "Legal Age" module and the "Parent" list were complete because all associated fields received required input based on the associated conditions.

For example, based on the result, the server determined the "Legal Age" module received all required input at least in part because the "Name", "Email", and "Bday" fields of the module received the required input from the builder data that is indicated by set of symbols 446*b*. The builder input data to the "Name" (e.g., "John Smith"), "Email" (e.g., "jsmith@intuit.com"), and "Bday" (e.g., "4/20/2003") fields is further displayed in set of cells 416 in order to show the user what input was used to determine the completeness of those fields. In particular, the "Name" field and the "Bday" field are associated with a checkmark symbol because the runner input received satisfied the condition associated with the row (e.g., the conditions of rows 5 and 7 are associated with blank indicators and modifiers, meaning that the "Name" and "Bday" fields must receive runner input under all circumstances). The "Email" field is instead associated with the triangular symbol because the condition associated with the row not satisfied, and thus, the "Email" field did not need to receive runner input, and even did not need to be presented to the user. In other embodiments, the "Email" may also be associated with the checkmark symbol, as it still received input and is considered complete, even though the associated condition was not satisfied. Thus, each of rows 5-7 are considered complete, and the server displays set of symbols 446*b* indicating the completeness of those rows. If a row was not considered complete, the server would display an "X" symbol for that row indicating that the row was not complete.

After determining the "Name", "Email", and "Bday" fields are considered complete, the server determines that the "Legal Age" module does not short-circuit based on the result because the "Age" value associated with the runner input (e.g., "17.97") is not "less than" "13". Thus, the server displays symbol 446*c* based on that determination, which is a single rectangle representing that the module did not short-circuit based on the condition of row 8.

Next, the server determines whether the "Parent" list, as shown in cell 9D, needs to receive input based on the result. Thus, since the "Age" value associated with the runner input (e.g., 17.97 as shown in cell 9J) is "less than" "18" (as defined by the modifiers of cells 9F-9I), the "Parent" list requires certain input. Therefore, based on the result, the server determines one or more aspects about the "Parent" list in order to determine whether it has received the required input.

For example, a determined aspect may be that the "Parent" list must receive input for the "Legal Age" module to be complete, as shown by row 9. The required input for the "Parent" list is defined by rows 13-18; thus, in order for the "Parent" list to be considered complete, "all of" (as shown by the modifier input to cell 13F) the fields referenced in set of cells 418 must receive input based on whether the condition of the corresponding row is satisfied, and additionally, the condition associated with row 13 must also be satisfied. Based on the result, the server can determine that the "Pname", "Pemail", "Psign", and "Pday" fields all received runner input (e.g., as shown in cells 426). Further, the server may also determine that the conditions for each row of rows 13-17 have been satisfied because the rows only contained blank indicators and modifiers, meaning that any input to the field would satisfy the condition. Lastly, the server may further determine that the list may still be complete because the "Page" value is not less than 18, as indicated by the condition of row 18. Thus, the server displays set of symbols 448*b* to indicate that the rows 14-18 have received the required input. Additionally, based on the result, the server determines that row 13 is complete based on the runner input satisfying the condition associated with row 13.

After determining that the "Parent" list has received the required input, the server determines whether the "Guardian" list needs to receive input based on the result and displays an associated symbol. Since the "Age" value associated with the runner input (e.g., "17.97" as shown by cell 10K) is "less than" "18", but the "Pname" field received runner input and therefore is not "UNKNOWN", the server determines that the "Guardian" list does not need to receive input because at least one of the conditions associated with row 10 was not satisfied. Thus, the server displays symbol 446*e* (e.g., a triangular symbol) to denote an aspect indicating that the "Guardian" list was complete, regardless of any input to the fields of the "Guardian" list.

Further, while the user interface 400 contains the list defining what fields must receive input for the "Guardian" list to be complete, the server determines an aspect based on the result that the "Guardian" list does not need to be analyzed because one of the conditions associated with row 10 was not satisfied. Thus, in this depicted example, the server displays symbol 450 (e.g., a triangular symbol) corresponding to row 20 in order to denote that the "Guardian" list is considered complete because at least one of the conditions associated with the "Guardian" list was not satisfied (e.g., and thus, the referenced fields of the "Guardian" list did not need to receive input in order to be considered complete). In other embodiments, the server may further display symbols, such as an "?", for each row of rows 21-25 denoting that each specific field within the "Guardian" list was not evaluated, and thus, the server did not determine whether the fields of the row required runner input based on their associated conditions.

Thus, based on the result returned by the knowledge engine and the aspects determined by the server, the server displays symbol 446*a* indicating the completeness of the module, including the completeness of the lists and fields within the module.

In this depicted embodiment, the knowledge engine evaluates the completeness of the rows in the order that the rows are shown (e.g., from top to bottom). In other embodiments, the knowledge engine evaluates and rows, in a specific order defined in another user interface, such as user interface 300. For example, in that embodiment, the knowledge engine may wait to evaluate a specific field or list until a separate list has been evaluated (e.g., the knowledge engine may evaluate row 9 on whether the "Parent" list should be evaluated, and subsequently, may evaluate rows 13-18 to determine if the "Parent" list is complete, before evaluating row 10 on whether the "Guardian" list should be evaluated). Thus, the result for each of those embodiments may be different, and may cause the server to display one or more extra symbols than are shown in the depicted embodiment. In yet another embodiment, the knowledge engine evaluates the completeness of rows in an arbitrary order.

Further, in this depicted embodiment, certain conditions may define a constant that the value of a field may be compared to, such as "UNKNOWN" of cell 6H or 11H, "13" of cell 8H, and "18" of cell 9H or 10H. In other embodiments, instead of constants, the input to those cells may reference fields. In those embodiments, the knowledge engine will use the value of the referenced field when evaluating the condition of that row, and will indicate that in the result.

FIG. 5 depicts an example user interface 500 displaying one or more symbols based on the results of executing an artifact based on the builder input defining a completeness graph of a module and runner input to the fields of the module. For example, input to user interface 300 of FIG. 3 may define the completeness graph, while builder input may be input to user interface 200 of FIG. 2. In this depicted example, user interface 500 is based on the builder input to user interface 300 as well as builder input defining an extra "Address" list defined by fields of the module, as shown by row 12 and rows 28-31. As similarly discussed with respect to FIG. 4, the server generates an artifact based on the builder input and the runner input, which the knowledge engine may execute to return a result to the server indicating one or more aspects of the rows defined by the builder input.

As shown in this depicted example, in order for the module to be considered complete, (1) the "Name", "Email", and "Bday" fields must be considered complete based on the conditions of rows 5-7, and (2) the "Parent" list, the "Guardian" list, and the "Address" list must receive required input in order to be considered complete if the module does not short-circuit.

As shown by the builder input data in set of cells 518, the "Name", "Email", and "Bday" fields received runner input, and thus the server determines that the fields are complete based on the result returned by the knowledge engine. In this depicted example, the server displays a checkmark symbol for both the "Name" and the "Bday" field because the associated conditions are satisfied, while the server displays the triangular symbol because the associated condition is not satisfied and thus the "Email" field did not need to receive input. Since the fields are complete, the server determines the set of symbols 550*b* corresponding to rows 5-7, indicating the fields of the rows received all required input, and thus, the rows are considered complete.

Next, the server determines a symbol for the row 8 based on if the module short-circuited or not. Based on the result, the server determines that the module did not short-circuit because the "Age" value associated with the builder input (e.g., 18) is not "less than" "13", and therefore, does not satisfy the condition defined by the indicators and modifiers of row 8. Thus, the server determines the single rectangle as the symbol to display for row 8, and displays symbol 550*c* to indicate the module did not short-circuit based on the evaluation of that row.

The server further evaluates whether or not the "Parent" and "Guardian" lists are considered complete based on the result. Based on the result, the server determines that the "Parent" list does not need to receive input in order to be considered complete because the "Age" value is associated with the runner input is not "less than" "18", and therefore, the condition of row 9 is not satisfied. Thus, since the row references a list that is complete regardless of whether it is evaluated, the server displays the triangular symbol 550*d* to denote that the "Parent" list is complete regardless of whether it received input. Further, the server also displays question mark symbol 552*a* corresponding to row 14, which defines that the "Parent" list is complete subject to the "Pname", "Pemail", "Psign", and "Pday" fields receiving input, in order to further show that the "Parent" list does not need to receive input in order to be considered complete because the condition associated with row 14 was not satisfied. Thus, even though the builder input did not receive runner input to the "Pname", "Pemail", "Psign", and "Pday" fields (as indicated by set of cells 528, where the runner input for each field is "UNKNOWN") and the server displays set of symbols 552*b* to denote that those fields did not receive runner input, the "Parent" list is still considered complete.

Additionally, based on the result, the server determines that the "Guardian" list does not need to receive input in order to be considered complete because the "Age" value associated with the runner input is not "less than" "18", and therefore, does not satisfy the conditions of rows 10 and 11. Thus, since the row references a list that is complete regardless of whether it is evaluated, the server displays the triangular symbol 550*e* to denote that the "Guardian" list is complete regardless of whether it received input. Further, the server displays triangular symbol 554*a* to indicate the condition of row 11 was already determined to not be satisfied, and the "Guardian" list only needed to receive input to be considered complete if both conditions were satisfied. The server also displays questions mark symbol 554*a* corresponding to row 21, where row 21 defines that the "Guardian" list is complete subject to the "Gname", "Gemail", "Gsign", and "Gday" fields receiving input, in order to further show that the "Guardian" list does not need to be evaluated because it does not need to receive input in order to considered complete since the condition associated with row 11 was not satisfied. Thus, even though the runner input did not contain input to the "Gname", "Gemail", "Gsign", and "Gday" fields (as indicated by set of cells 538, where the runner input for each field is "UNKNOWN") and the server displays set of symbols 554*b* to denote that those fields did not receive input, the "Guardian" list is still considered complete.

Since the "Parent" list and "Guardian" list were determined to be complete regardless of receiving input, and thus do not affect the completeness of the module, the module only further needs to receive input to the "Address" list as indicated by row 12, based on the condition of row 12. Since the indicators and modifiers of row 12 are blank indicators, the "Address" list must always be evaluated unless the module either short-circuits or dead-ends before evaluating the address list in order for the condition to be satisfied.

As the server determines, based on the result, that the module neither short-circuited nor dead-ended (e.g., because the condition associated with row 8 was not satisfied), the server also evaluates whether the "Address" list is considered complete. Based on the result, the server determines that certain fields referenced by the "Address" list require input in order to be considered complete because the indicators and modifiers of row 12 are blank, indicating that there is no condition for which the "Address" list does not require runner input. Thus, the server further evaluates, based on the result, whether the fields referenced in rows 29-31 received the required runner input and displays symbols set of symbols 556b indicating that the rows are complete since they have received the required input based on associated conditions. In addition, since all required input for the "Address" list was received, the server further displays symbol 550g corresponding to row 12 and symbol 556a corresponding to list row 508 to indicate that the "Address" list is complete.

Thus, as indicated by symbol 550a, the "Legal Age" module is considered complete because it has received all required runner input. More specifically, the server determined, based on the result, that the "Name", "Email", and "Bday" fields all received the required input, as indicated by set of symbols 550b. Further, the server determined, based on the result, that the module did not short-circuit based on the condition associated with row 8, as indicated by symbol 550c. The server also determined, based on the result, that the module did not need to evaluate either the "Parent" list or the "Guardian" list because they would be complete regardless of whether they received input, and displayed symbols 550d and 550e. Lastly, the server determined, based on the result, that the "Address" list received the required input, as indicated by symbol 550g.

Example of Debugging a Module where the Runner Input Caused a Short-Circuit

FIG. 6 depicts an example user interface 600 displaying one or more symbols 608a, 608c-e, 610a, and 612a, and sets of symbols 608b, 610b, and 612b based on the results of executing an artifact based on the builder input defining a completeness graph, such as the input to user interface 300 of FIG. 3, and runner input to the fields of the module, that may be input to a user interface such as user interface 200 of FIG. 2.

In this depicted example, as similarly described with respect to FIG. 5, the "Name", "Email", and "Bday" fields of rows 5-7 received the required input as shown by the runner input in set of cells 614. Thus, based on the result returned by the knowledge engine, the server determines the fields referenced by rows 5-7 are complete and displays set of symbols 608b.

Next, as similarly described with respect to FIG. 5, the server determines a symbol for the row 8 based on if the module short-circuited or not. Based on the result, the server determines that the module did short-circuit because the "Age" value associated with the builder input (e.g., "10" as shown in cell 8J) is "less than" "13", and therefore, satisfies the condition of row 8. Thus, the server determines and displays phi CO symbols 608a and 608c to indicate the module short-circuited.

As described above with respect to FIG. 3, when a module short-circuits, the remaining rows of the module that have not been evaluated do not need to receive input in order for the module to be considered complete. Thus, in the depicted example, the server determines the "Parent" list and the "Guardian" list do not need to receive input in order for the module to be considered complete and displays the double rectangular symbols 608d and 608e to indicate that the lists did not need to be evaluated. Further, in this depicted example, the server displays symbol 610a and symbol 612a corresponding to rows 13 and row 20, respectively, to indicate that the lists associated rows did not have to be evaluated.

In this depicted embodiment, the set of rows 14-18 and set of rows 21-25 associated with the "Parent" list and "Guardian" list, respectively, were evaluated even though they were not required to be evaluated. In other embodiments, the server may not evaluate set of rows 14-18 and set of rows 21-25, which may reduce processing requirements and save time, and thus, power, used by the server.

Example of Debugging a Module where the Runner Input Caused a Dead-End

FIG. 7 depicts an example user interface 700 displaying one or more symbols 712a, 712c, 714, and 716, and sets of symbols 712b and 712d based on the results of executing an artifact based on the builder input defining a completeness graph of a module and runner input to the fields of the module. For example, input to user interface 300 of FIG. 3 may define the completeness graph, while runner input may be input to user interface 200 of FIG. 2.

As shown in this depicted example and as similarly described with respect to FIGS. 4-5, in order for the module to be considered complete, (1) the "Name" and "Email" fields must receive required input subject to the indicators and modifiers of rows 5-6 if the module does not short-circuit, (2) the "Age" value must not equal "UNKNOWN" as defined by the condition of row 7 if the module does not short-circuit, and (3) the "Parent" list and the "Guardian" list must be considered complete if the module does not short-circuit.

In this depicted example, as similarly described with respect to FIGS. 5-6, the "Name" and "Email" fields referenced by rows 5-6 received the required input as shown by the builder input in set of cells 710. Thus, the server determines and displays set of symbols 712b indicating that the "Name" and "Email" fields are complete.

However, unlike as described with respect to FIGS. 5-6, the "Bday" field did not receive input, and thus, the "Age" value associated with the runner input cannot be calculated, making it "UNKNOWN". Thus, the knowledge engine generates a result indicating that the "Age" value is unknown, and based on the result, the server displays the "UNKNOWN" value of cell 7B in set of cells 710. Since the row 7 does not reference a field in cell 7D, and instead indicates "THIS LIST WILL BE COMPLETE ONLY", the module dead-ends if the associated condition of the row is not satisfied. Since the "Age" value associated with the runner input equals "UNKNOWN", the condition is not satisfied. Thus, the server determines that the module dead-ended and displays symbol 712c (e.g., the "X" symbol) to indicate that the module dead-ended because the condition of row 7 was not satisfied.

In addition, since the module dead-ended and cannot be completed based on the received runner input, the server also determines that the "Legal Age" module is incomplete, and displays symbol skull-and-crossbones symbol 712a in order to indicate that the module is incomplete due to a dead end.

In this depicted example, after determining that the module is incomplete, the server does not evaluate the remaining rows 8-10 and displays set of symbols 712d as well as symbols 714 and 716 (e.g., "?" symbols) in order to indicate that those rows were not evaluated due to the dead-end caused by row 7. In other embodiments, the server may still evaluate the rows that did not need to be evaluated due to the dead-end, and may still display symbols indicating whether the fields or lists would have been complete if the module had not dead-ended.

Thus, in this depicted example, as indicated by symbol 712*a*, the "Legal Age" module has not received all required input and is considered incomplete. More specifically, since the "Age" value associated with the runner input did not satisfy the condition of row 7 and the module dead-ended, as indicated by symbol 712*c*, the "Legal Age" module could not be completed.

Example of Debugging a Module where the Builder Input Includes an "any of" Modifier FIG. 8 depicts an example user interface 800 displaying one or more symbols 850*a*, 852*a*, 854*a*, and 856*a*, and sets of symbols 850*b*, 852*b*, 854*b*, and 856*b* based on the results of executing an artifact based on the builder input defining a completeness graph, such as the input to user interface 300 of FIG. 3, and runner input to the fields of the module, that may be input to a user interface such as user interface 200 of FIG. 2. In this depicted example, user interface 800 is based on the input to user interface 300 where the "Legal Age" module requires the "Adult" list to be completed instead of both the "Parent" list and the "Guardian" list to be completed, based on whether associated conditions are satisfied.

As shown in this depicted example, in order for the module to be considered complete, (1) the "Name", "Email", and "Bday" fields must receive required input subject to the indicators and modifiers of rows 5-7, and (2) the "Adult" list must be considered complete if the module does not short-circuit. In order for the "Adult" list to be considered complete at least one of the "Parent" list or the "Guardian" needs to be considered complete, as shown by the indicator of cell 11E and modifier of cell 11F (e.g., "any of").

As shown by the builder input to cells 818, the "Name", "Email", and "Bday" fields received builder input, and thus the server determines that the fields are complete and displays the appropriate symbols. Further, based on the result, the server displays the appropriate symbol after determining that the module did not short-circuit because the "Age" value associated with the builder input (e.g., 18) is not "less than" "13", and therefore, does not satisfy the condition associated with the row.

The server then evaluates the "Adult" list based on the result returned by the knowledge engine. Thus, according to the condition of row 11, only one of the "Parent" list and the "Guardian" list needs to be completed in order for the "Adult" list to be considered complete. In this depicted example, based on the result, the server determines that the "Guardian" list is complete based on the builder input indicated in set of cells, and displays the appropriate symbols. Thus, since at least one of the "Parent" list and the "Guardian" list is satisfied, the server determines that the "Adult" list is also satisfied, and thus displays symbol 852*a* indicating that the "Adult" list is complete. In particular, the server further displays set of symbols 852*b* in order to indicate that the "Parent" list was incomplete and the "Guardian" list was complete, showing that the "Parent" list may be incomplete while the "Adult" list is still complete.

In this depicted example, the server evaluates the "Parent" list even though only the "Guardian" list was already completed, and displays the appropriate symbols. In other examples, if the server already determined that the "Adult" list was completed, the server may not evaluate the other requirements of the "Adult" list.

Thus, as indicated by symbol 850*a*, the "Legal Age" module has received all required input and is considered complete, which is based at least in part on the "Adult" list receiving the required input.

Example Method of Defining a Completeness of a Module

Figure 9:
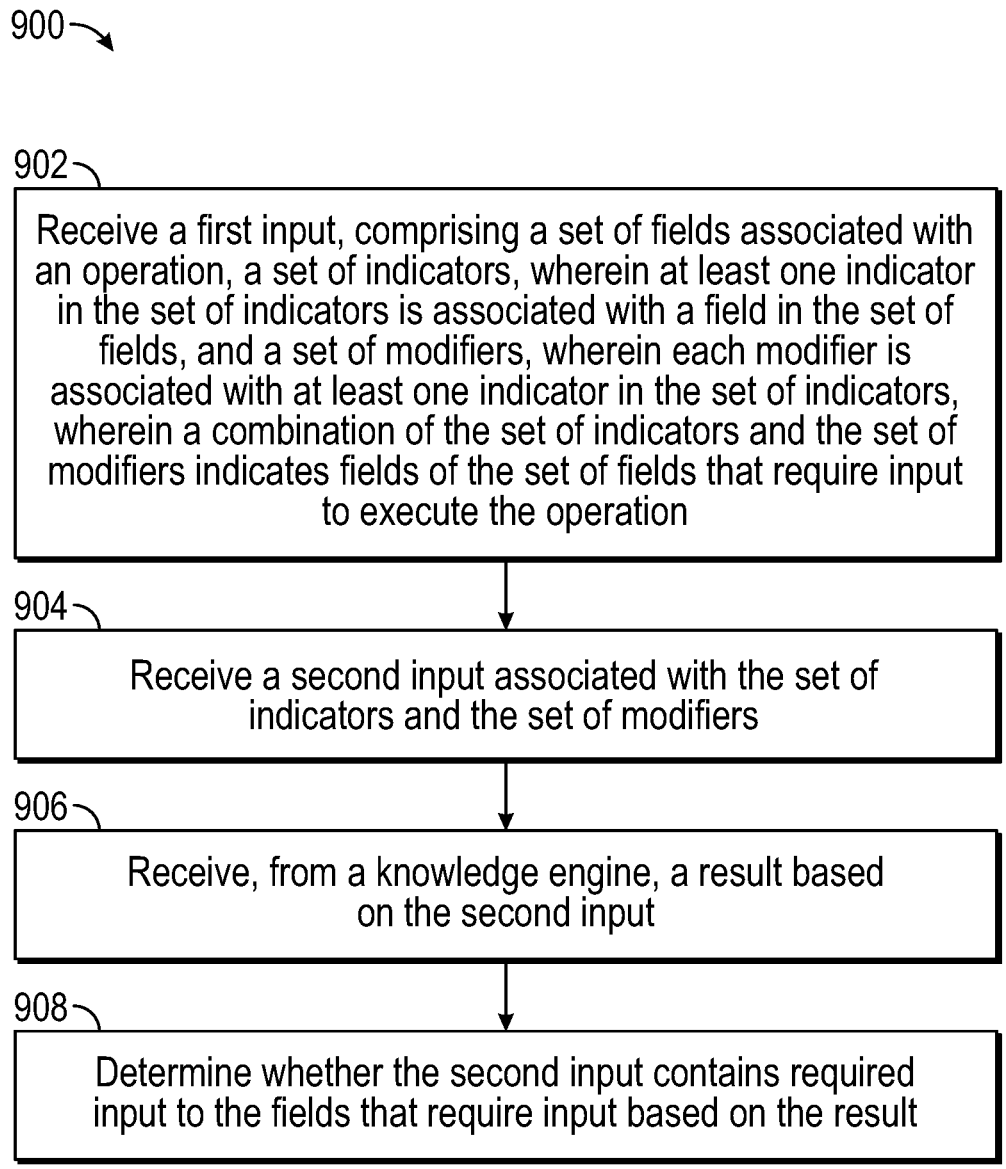
FIG. 9 depicts an example method of defining a completeness of a module.

FIG. 9 depicts an example method 900 of determining whether a module is complete based on builder input defining the completeness graph (e.g., input to user interface 300 of FIG. 3) and runner input associated with the fields of the module (e.g., that may be input to user interface 200 of FIG. 2).

At 902, a server (e.g., server 102 of FIG. 1) receives a first input at a user interface, such as user interface 300. The first input (e.g., builder input as described with respect to FIGS. 2-8) may define the completeness graph of a module associated with performing an operation, where the completeness graph indicates what data needs to be received in order for the module to be considered complete. The first input may include data referencing a set of fields of the module, as well as a set of indicators and set of modifiers defining when the fields of the module are required to receive input when performing the operation. Thus, a combination of the set of indicators and set of modifiers define conditions for when certain fields of the set of fields require input.

In some embodiments, each field may correspond to at least one indicator and at least one modifier. A field may further correspond to multiple conditions defined by certain indicators and modifiers, where the condition indicates when the field must receive input. In some embodiments, the fields, indicators, and modifiers may be chosen from a drop down menu displayed in response to a user selection, while in other embodiments, the fields, indicators, and modifiers may be typed by the user.

The first input may further include one or more lists of fields of the module. For example, a list of fields may include data referencing one or more fields of the module that must receive input for the list to be complete, subject to the associated conditions of both the list and the fields within the list. In turn, certain lists may need to be considered complete in order for the entire module to be considered complete.

In some embodiments, the first input may be based in part on input defining a calculation graph of the module, such as input to user interface 200. The fields of the module that define the calculation graph of the module may be a part of the first input defining what fields require input in order for the module to be completed.

Certain referenced fields, indicators, and modifiers of the first input may indicate when the fields of the module require input, as described above with respect to FIG. 3. For example, certain indicators may indicate that a certain field, list, or module must receive input subject to a condition defined by associated modifiers (e.g., the "when" indicator as described with respect to FIG. 3"). Other indicators may indicate that a field of the module must be presented for a user, but does not require input (e.g., the "must be asked" indicator as described with respect to FIG. 3). Further, certain modifiers may define a condition that each field in a set of fields must receive input for a module or list to be complete (e.g., the "All of" modifier as described with respect to FIG. 3). Certain other modifiers may define a condition that only one field in a set of fields must receive input for a module or list to be complete (e.g., the "Any of" modifier as described with respect to FIGS. 3 and 8). Some modifiers may be combined in order to compare values associated with certain fields to other values defined by the first input (e.g., the "IS LESS THAN", "IS GREATER THAN", "EQUALS", "DOES NOT EQUAL", "IS LESS THAN OR EQUAL TO", or "IS GREATER THAN OR EQUAL TO" modifiers as described with respect to FIG. 3). Certain modifiers may connect conditions defined by other modifiers in the conjunctive or disjunctive so that a field must receive input when (1) both conditions are satisfied, or (2) either condition is satisfied, respectively (e.g., the "and" and "or" modifiers as described with respect to FIG. 3).

Even further, the first input may include information indicating that a module or list will short-circuit if an associated condition is satisfied (e.g., the "THIS LIST WILL SHORT CIRCUIT" field as described with respect to FIG. 3.

Thus, the first input received at the server defines which fields of the module require input under certain conditions, where there may be multiple fields, and multiple conditions defined by indicators and modifiers that indicate when those fields require input.

At 904, the server receives a second input (e.g., runner input as described with respect to FIGS. 2-8) at a user interface. In some embodiments, the second input may be received at a different user interface or a different user interface view, such as user interface 200, than the first input. In other embodiments, the second input may be received at the same user interface as the first input. The second input includes data input to the fields of the module. In some embodiments, the data may be runner input to a user interface, such as input to user interface 200. In other embodiments, the data may be client input received from a computing device (such as computing device 106 of FIG. 1). The second input may be analyzed in order to determine if the second input to the module contains all required input to the fields of the module that require input.

In some embodiments, the server may generate an artifact based on the first input and the second input that may be executed by a knowledge engine. In some embodiments, the server may generate the artifact based on just the first input. The knowledge engine may execute the artifact and return a result based on the artifact. In some embodiments, the knowledge engine may determine if the module is complete based on the second input and include that determination in the result. The server may use an application programming interface (API) in order to provide the artifact to the knowledge engine.

At 906, the server receives the result from the knowledge engine. In some cases, the server may receive the result through an API.

At 908, the server determines whether the second input contains required input to the fields that require input based on the result received from the knowledge engine. The server analyzes the result to determine one or more aspects associated with any combination of the module, each list of the module, and/or each field of the module. For example, the server may determine that each field of the module and each list of the module has received the required input through the second input, subject to the conditions defined by the combination of indicators and modifiers of the first input. The server may also determine, based on the result, that the module did not receive the required input, and therefore is not complete, because the second input did not contain the required input as defined by the combination of indicators and modifiers of the first input.

The server may further determine, based on the result, that the module or certain lists of the module short-circuited because one or more conditions were or were not satisfied, and therefore, certain other lists or fields did not need to be evaluated. The server may further determine, based on the result, that certain fields or lists of the module were not evaluated because the evaluation of the module or a list dead-ended based on the conditions of the first input.

Thus, with the referenced fields and the conditions defined by the indicators and modifiers, a user may more quickly define a completeness graph using fewer resources than conventional methods. As a result, the generated artifact based on the builder input and runner input requires fewer resources to generate and less processing requirements to execute, thus increasing the efficiency and decreasing the amount of resources needed to generate and test the completeness graph.

Additionally, analyzing the result, the server may display one or more symbols indicating aspects of the result, such as if certain referenced fields received the required input based on the associated conditions. For example, the server may display symbols indicating that certain fields, lists, or modules are complete, not complete, or were not required to be complete, based on associated conditions. The server may also display symbols indicating that certain fields or lists were not evaluated because the module or a list dead-ended. Additionally, the server may display symbols indicating if certain lists or fields were not required to be complete based on associated conditions. Thus, after receiving and analyzing the result, the server may display symbols in order to show if the completeness graph is working properly, and help refine the definition of the completeness graph if it is properly defined.

Note that FIG. 9 is just one example of a method, and other methods including fewer, additional, or alternative steps are possible consistent with this disclosure.

Example Method of Debugging a Completeness Graph of a Module

Figure 10:
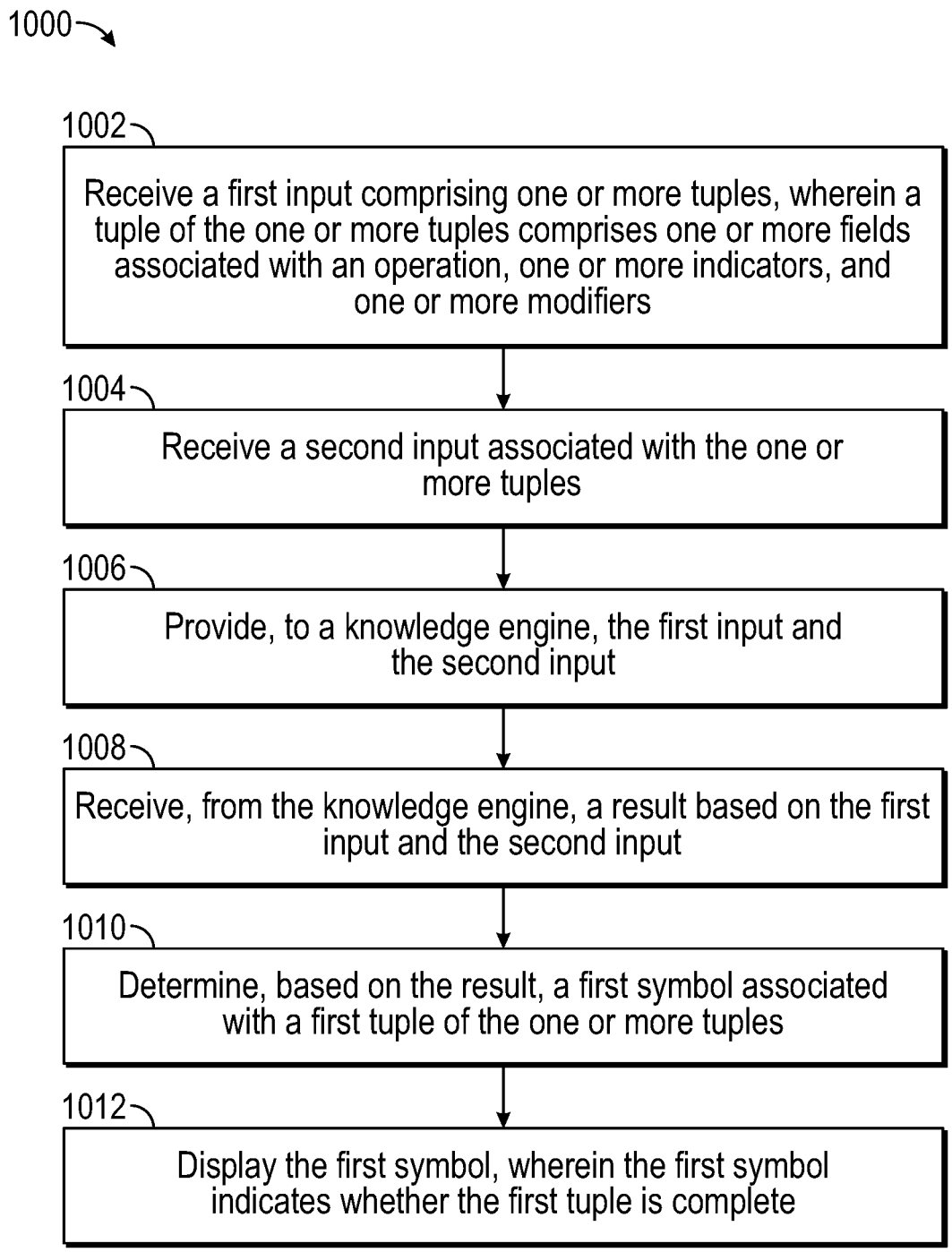
FIG. 10 depicts an example method of debugging a completeness graph based on builder input.

FIG. 10 depicts an example method 1000 of debugging a module based on builder input defining the completeness graph (e.g., input to user interface 300 of FIG. 3) and runner input to the fields of the module (e.g., input to set of cells 220 of FIG. 2). The builder input and the runner input may be input to one or more user interfaces, such as user interface 300, of one or more computing devices (e.g., computing device 104 and computing device 106 of FIG. 1) associated with a server (e.g., server 102 of FIG. 1).

At 1002, the server receives a first input (e.g., builder input as described with respect to FIGS. 2-8) comprising one or more fields of a module and associated indicators and modifiers defining conditions associated with the one or more fields, where each field and corresponding indicators and modifiers create an input tuple, as described with respect to FIGS. 3-8. In some embodiments, a single field may correspond to multiple indicators and multiple modifiers. In some embodiments, a tuple may be a row of cells. In other embodiments, a tuple may be another combination of cells or an arrangement that does not include cells. Together, the tuples of fields, indicators, and modifiers define the completeness of the module, such as when certain fields require input based on the conditions defined by the indicators and modifiers.

Each indicator may be from a plurality of indicators and each modifier may be from a plurality of modifiers, as described above with respect to FIG. 3.

At 1004, the server receives a second input (e.g., runner input as described with respect to FIGS. 2-8) associated with the one or more tuples, such as test input to one or more fields for the module. In some embodiments, the second input may be input to a separate user interface (such as user interface 200 of FIG. 2) than the user interface receiving the first input. In other embodiments, the second input may be input to the same user interface as the first input.

At 1006, the server may provide the first input defining the completeness and the second input testing the completeness to a knowledge engine. The server may provide the inputs to the knowledge engine by way of an artifact created based on both inputs, as described with respect to FIGS. 1-3. The knowledge engine may receive and execute the artifact in order to determine if certain fields received input and if the input was required based on the conditions defined by the first input. Based on the determination, the knowledge engine may generate and return a result to the server indicating one or more aspects of each tuple. For example, the result may indicate that a tuple is complete, incomplete, or another aspect of the tuple because one or more fields, one or more lists, and/or the entire module is received (or did not receive) certain input.

At 1008, the server may receive the result based on the first input and the second input from the knowledge engine, as described with respect to FIGS. 1-3. The result may indicate one or more aspects of each tuple of the first input. In some embodiments, the result may indicate one or more aspects of only one or more certain subsets of tuples of the first input. The one or more aspects for a tuple may include an indication that tuple received required input and therefore is considered complete, did not receive the required input and therefore is not considered complete, that the input to the tuple caused the module or a list to short-circuit, that the input to the tuple caused the module or a list to dead-end, that a tuple or a set of tuples was not evaluated, that a tuple or a set of tuple did not need to be evaluated for the module to be considered complete, or another aspect. In addition, the result may indicate one or more aspects for a list tuple of the module.

At 1010, the server determines, based on the result, a first symbol associated with a first tuple of the first input based on an aspect of the first tuple. In some embodiments, the first symbol may indicate if the first tuple is considered complete (e.g., because it received the required input). Further, the server may determine symbols associated with other tuples of the first input based on aspects associated with those tuples. Additionally, the server may determine more than one symbol for a tuple if the result indicates more than one aspect for the tuple.

At 1012, the server displays the first symbol indicating an aspect of the first tuple, such as whether the first tuple is considered complete. In some embodiments, the server may display more than one symbol for a tuple based on if the server determined more than one aspect associated with the tuple.

In some embodiments, after displaying the one or more symbols associated with the tuples based on input associated with the one or more fields, lists, and/or modules, the server may receive new builder input and/or new test input to a user interface, such as user interface 200 or user interface 300, and generate a new artifact based on the one or more new inputs. The server may provide the new artifact to the knowledge engine, which may return a new result indicating that the tuples and referenced fields, lists, and/or module are considered complete based on the new inputs. The server may then receive the new result, determine that the tuples and referenced fields, lists, and/or module are considered complete, and display one or more new symbols indicating that the fields, lists, and/or module are considered complete.

For example, the server may display one or more symbols indicating that certain tuples are complete, as described with respect to FIGS. 4-8, or that tuples are incomplete, as described with respect to FIGS. 7-8, because certain input was not received. Additionally, the server may display one or more symbols indicating that certain tuples caused the module or a list of the module to short-circuit, while displaying other symbols indicating that certain tuples did not need to be evaluated based on that short-circuiting, as described with respect to FIG. 6. Even further, the server may display one or more symbols indicating that certain tuples dead-ended, and may also display other symbols indicating that other tuples were not evaluated due to that dead-end, as described with respect to FIGS. 7-8. As another example, the server may further display one or more symbols indicating that a certain tuple is complete based on an associated condition even though an associated field did not receive input.

Thus, by using the fields and conditions defined by the second input, the server requires less time and processing power to run the completeness graph against the knowledge engine because it must only check if certain conditions are satisfied or not satisfied rather than having to check if every possible combination of input has been entered. Additionally, by displaying the symbols, the server further creates a more efficient way for a user to determine if the completeness graph has been defined as desired, and as a result, can continue to test the completeness graph by running it against the knowledge engine multiple times, which, as described above, requires less time and processing power than conventional methods.

Note that FIG. 10 is just one example of a method, and other methods including fewer, additional, or alternative steps are possible consistent with this disclosure.

Example Processing Device for Defining and Debugging a Completeness Graph

Figure 11:
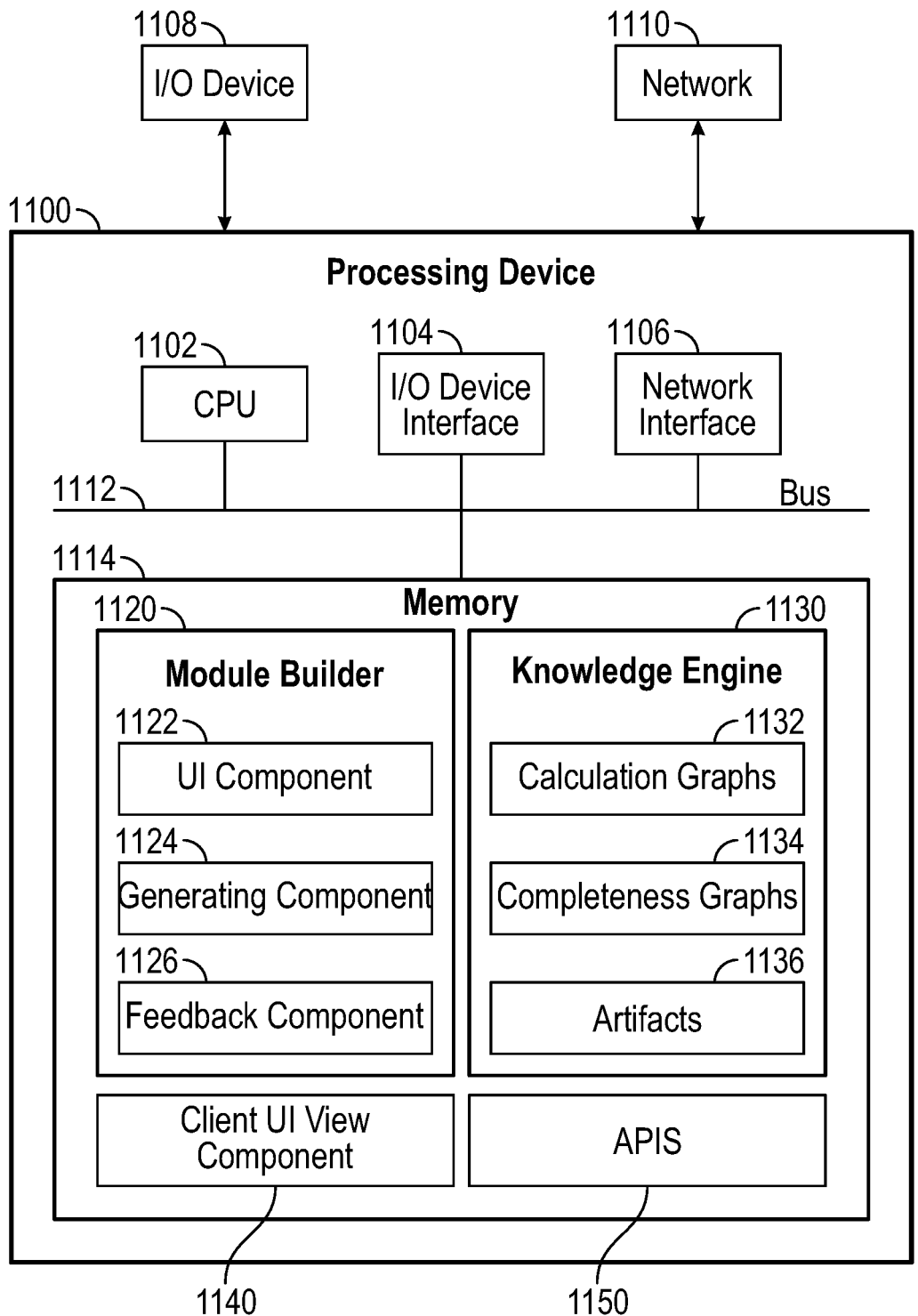
FIG. 11 depicts an example processing device that may be configured to perform the methods described herein.

FIG. 11 depicts an example processing device 1100 that may perform the methods described herein with respect to FIGS. 9-10. For example, the processing device 1100 can be a physical processing device or virtual server and is not limited to a single processing device that performs the methods described above.

Processing device 1100 includes a central processing unit (CPU) 1102 connected to a data bus 1112. CPU 1102 is configured to process computer-executable instructions, e.g., stored in memory 1114, and to cause the processing device 1100 to perform methods described above. CPU 1102 is included to be representative of a single CPU, multiple CPUs, a single CPU having multiple processing cores, and other forms of processing architecture capable of executing computer-executable instructions.

Processing device 1100 further includes input/output (I/O) device(s) 1108 and I/O device interfaces 1104, which allows processing device 1100 to interface with input/output devices 1108, such as, for example, keyboards, displays, mouse devices, pen input, and other devices that allow for interaction with processing device 1100. Note that processing device 1100 may connect with external I/O devices through physical and wireless connections (e.g., an external display device).

Processing device 1100 further includes a network interface 1106, which provides processing device 1100 with access to external network 1110 and thereby external personal devices.

Processing device 1100 further includes memory 1114, which in this example includes a module builder 1120, a knowledge engine 1130, a client UI view component 1140, and APIs 1150.

In this example, module builder 1120 may further include UI component 1122, generating component 1124, and feedback component 1126. UI component 1122 may display one or more user interfaces that may receive builder input defining a calculation graph, a completeness graph, or a user interface view. UI component 1122 may further receive runner input for testing a completeness graph. Generating component 1124 may use the user input received at UI component 1122 to generate one or more artifacts based on the builder input. The one or more artifacts may further be based on the runner input. The feedback component 1126 may receive one or more results from the knowledge engine indicating one or more aspects associated with the builder input and the runner input. Further, the feedback component 1126 may determine one or more symbols to display based on the one or more aspects associated with the input and may provide the one or more symbols to the UI component 1122 for display on a user interface.

Further, in this example, the knowledge engine 1130 may further include calculation graphs 1132, completeness graphs 1134, and artifacts 1136. Calculation graphs 1132 may include calculation graphs associated with modules of the knowledge engine, and may further create or update calculation graphs for modules based on the artifacts generated by generating component 1124. Completeness graphs 1134 may include completeness graphs associated with modules of the knowledge engine, and may further create or update completeness graphs for modules based on the artifacts generated by generating component 1124. Artifacts 1136 may receive and store artifacts generated by generating component 1124 for use by the knowledge engine 1130. For example, the knowledge engine may execute an artifact generated by generating component 1124 or stored in artifacts 1136 against a calculation graph of calculation graphs 1132 and/or a completeness graph of completeness graphs 1134 in order to generate a result.

Additionally, in this example, client UI view component 1140 may generate a user interface view to send to a computing device. Additionally, client UI view component 1140 may receive input from the computing device for use by the module builder 1120 and/or knowledge engine 1130.

In this example, APIs 1150 may provide the artifacts generated by generating component 1124 to the knowledge engine based on input received at the UI component 1122. Further APIs 1150 may provide the results generated by knowledge engine 1130 to the module builder 1120.

Note that while shown as a single memory 1114 in FIG. 11 for simplicity, the various aspects stored in memory 1114 may be stored in different physical memories, but all accessible by CPU 1102 via internal data connections such as bus 1112. While not depicted, other aspects may be included in memory 1114.

Note that FIG. 11 is just one example of a processing system, and other processing systems including fewer, additional, or alternative aspects are possible consistent with this disclosure.

Example Computing Device

Figure 12:
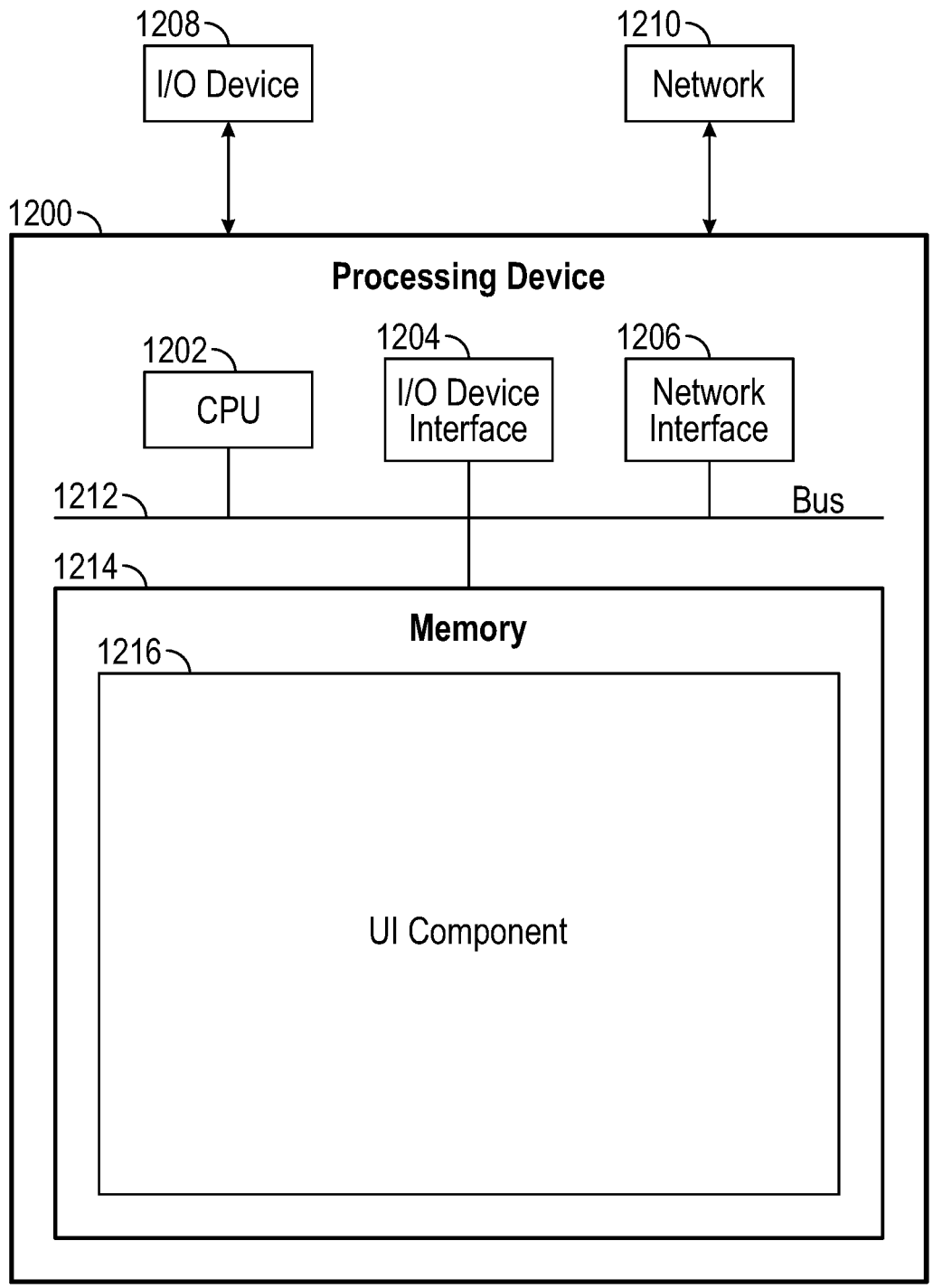
FIG. 12 depicts an example computing device.

FIG. 12 depicts an example processing device 1200 that may perform the methods described herein. For example, the processing device 1200 can be a physical processing device such as a laptop, tablet, or smartphone, and is not limited to a single processing device that performs the methods herein.

Processing device 1200 includes a central processing unit (CPU) 1202 connected to a data bus 1212. CPU 1202 is configured to process computer-executable instructions, e.g., stored in memory 1214, and to cause the processing device 1200 to perform methods described above. CPU 1202 is included to be representative of a single CPU, multiple CPUs, a single CPU having multiple processing cores, and other forms of processing architecture capable of executing computer-executable instructions.

Processing device 1200 further includes input/output (I/O) device(s) 1208 and I/O device interfaces 1204, which allows processing device 1200 to interface with input/output devices 1208, such as, for example, pen input, microphones, and other devices that allow for interaction with processing device 1200. Note that processing device 1200 may connect with external I/O devices through physical and wireless connections (e.g., an external display device).

Processing device 1200 further includes a network interface 1206, which provides processing device 1200 with access to external network 1210 and thereby other processing devices.

Processing device 1200 further includes memory 1214, which in this example includes UI component 1216. UI component 1216 may display one or more user interfaces each with one or more user interface views that may receive user input that may be used for defining a calculation graph, completeness graph, or client UI view for a module.

Note that while shown as a single memory 1214 in FIG. 12 for simplicity, the various aspects stored in memory 1214 may be stored in different physical memories, but all accessible by CPU 1202 via internal data connections such as bus 1212. While not depicted, other aspects may be included in memory 1214.

EXAMPLE CLAUSES

Implementation examples are described in the following numbered clauses:

Clause 1: A method for encoding rules defining a completeness of input, comprising: receiving a first input comprising one or more tuples, wherein a tuple of the one or more tuples comprises one or more fields associated with an operation, one or more indicators, and one or more modifiers; receiving a second input associated with the one or more tuples; providing, to a knowledge engine, the first input and the second input; receiving, from the knowledge engine, a result based on the first input and the second input; determining, based on the result, a first symbol associated with a first tuple of the one or more tuples; and displaying the first symbol, wherein the first symbol indicates whether the first tuple is complete.

Clause 2: The method of Clause 1, further comprising: determining that a first list comprises a first subset of the one or more tuples; determining, based on the result, one or more aspects associated with the first list; and displaying a second symbol indicating the one or more aspects associated with the first list.

Clause 3: The method of any one of Clauses 1-2, wherein: a combination of an indicator of the first tuple and a modifier of the first tuple defines a condition associated with the first tuple, and the method further comprises: determining the second input does not satisfy the condition associated with the first tuple; and receiving a third input that satisfies the condition associated with the first tuple.

Clause 4: The method of any one of Clauses 1-3, further comprising displaying a first value of the second input associated with a field of the first tuple.

Clause 5: The method of Clause 2, wherein: determining, based on the result, the one or more aspects associated with the first list comprises: evaluating the first list based on the result; determining that a second list comprises a second subset of the one or more tuples; and determining to not evaluate the second list based on the evaluating the first list; and the method further comprises displaying a third symbol indicating that the second list is not evaluated.

Clause 6: The method of Clause 5, wherein the third symbol further indicates whether the second list would be evaluated based on a different result.

Clause 7: The method of any one of Clauses 5-6, wherein: the first list comprises the first tuple and a second tuple; determining, based on the result, the one or more aspects associated with the first list comprises: evaluating the first list based on the result by: determining that the second input contains required input to the first tuple; and determining that the second tuple does not require input based on determining that the second input contains the required input to the first tuple; and wherein the second symbol further indicates that the second tuple does not require input based on determining that the second input contains the required input to the first tuple.

Clause 8: The method of Clause 7, further comprising displaying a third symbol indicating that the second input contains input to a field of the second tuple.

Clause 9: The method of any one of Clauses 2 and 7-8, further comprising evaluating a second list comprising a second subset of the one or more tuples.

Clause 10: The method of any one of Clauses 7-9, further comprising determining not to evaluate a second list based on the evaluating the first list.

Clause 11: The method of any one of Clauses 1-10, wherein the first symbol associated with the first tuple further indicates either that: the second input contains input to a field of the first tuple; or the second input does not contain input to the field of the first tuple.

Clause 12: The method of Clause 11, wherein the first symbol associated with the first tuple further indicates whether the field of the first tuple requires input.

Clause 13: The method of any one of Clauses 1-12, wherein the first symbol associated with the first tuple further indicates that no tuples of the one or more tuples are evaluated after determining, based on the result, the first symbol associated with the first tuple.

Clause 14: The method of any one of Clauses 1-13, further comprising: determining, based on the result, that a second tuple did not need to be evaluated for the operation to be completed; and displaying a second symbol for a second tuple indicating that second tuple did not need to be evaluated for the operation to be completed.

Clause 15: A processing system, comprising: a memory comprising computer-executable instructions; one or more processors configured to execute the computer-executable instructions and cause the processing system to perform a method in accordance with any one of Clauses 1-14.

Clause 16: A processing system, comprising means for performing a method in accordance with any one of Clauses 1-14.

Clause 17: A non-transitory computer-readable medium comprising computer-executable instructions that, when executed by one or more processors of a processing system, cause the processing system to perform a method in accordance with any one of Clauses 1-14.

Clause 18: A computer program product embodied on a computer-readable storage medium comprising code for performing a method in accordance with any one of Clauses 1-14.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for encoding rules defining a completeness of input, comprising:
receiving a first input comprising one or more tuples, wherein a tuple of the one or more tuples comprises one or more fields associated with an operation, one or more indicators, and one or more modifiers;
receiving a second input associated with the one or more tuples;
providing, to a knowledge engine, the first input and the second input;
receiving, from the knowledge engine, a result based on the first input and the second input;
determining, based on the result, a first symbol associated with a first tuple of the one or more tuples;
displaying the first symbol, wherein the first symbol indicates whether the first tuple is complete;
determining that a first list comprises a first subset of the one or more tuples;
determining, based on the result, one or more aspects associated with the first list based on:
evaluating the first list based on the result;
determining that a second list comprises a second subset of the one or more tuples; and
determining to not evaluate the second list based on the evaluating the first list;
displaying a second symbol indicating the one or more aspects associated with the first list; and
displaying a third symbol indicating that the second list is not evaluated.

2. The method of claim 1, wherein:
a combination of an indicator of the first tuple and a modifier of the first tuple defines a condition associated with the first tuple, and
the method further comprises:
determining the second input does not satisfy the condition associated with the first tuple; and
receiving a third input that satisfies the condition associated with the first tuple.

3. The method of claim 1, further comprising displaying a first value of the second input associated with a field of the first tuple.

4. The method of claim 1, wherein the third symbol further indicates whether the second list would be evaluated based on a different result.

5. The method of claim 1, wherein:
the first list comprises the first tuple and a second tuple;
determining, based on the result, the one or more aspects associated with the first list comprises:
evaluating the first list based on the result by:
determining that the second input contains required input to the first tuple; and
determining that the second tuple does not require input based on determining that the second input contains the required input to the first tuple; and
wherein the second symbol further indicates that the second tuple does not require input based on determining that the second input contains the required input to the first tuple.

6. The method of claim 5, further comprising displaying a third an additional symbol indicating that the second input contains input to a field of the second tuple.

7. The method of claim 5, further comprising evaluating a an additional list comprising an additional subset of the one or more tuples.

8. The method of claim 5, further comprising determining not to evaluate an additional list based on the evaluating the first list.

9. The method of claim 1, wherein the first symbol associated with the first tuple further indicates either that:
the second input contains input to a field of the first tuple; or
the second input does not contain input to the field of the first tuple.

10. The method of claim 9, wherein the first symbol associated with the first tuple further indicates whether the field of the first tuple requires input.

11. The method of claim 1, wherein the first symbol associated with the first tuple further indicates that no tuples of the one or more tuples are evaluated after determining, based on the result, the first symbol associated with the first tuple.

12. The method of claim 1, further comprising:
determining, based on the result, that a second tuple did not need to be evaluated for the operation to be completed; and
displaying an additional symbol for the second tuple indicating that the second tuple did not need to be evaluated for the operation to be completed.

13. A processing system, comprising:
a memory storing executable instructions; and
a processor configured to execute the executable instructions and cause the processing system to:
receive a first input comprising one or more tuples, wherein a tuple of the one or more tuples comprises one or more fields associated with an operation, one or more indicators, and one or more modifiers;
receive a second input associated with the one or more tuples;
provide, to a knowledge engine, the first input and the second input;
receive, from the knowledge engine, a result based on the first input and the second input;
determine, based on the result, a first symbol associated with a first tuple of the one or more tuples;
display the first symbol, wherein the first symbol indicates whether the first tuple is complete;
determine that a first list comprises a first subset of the one or more tuples;

determine, based on the result, one or more aspects associated with the first list based on:
  evaluating the first list based on the result;
  determining that a second list comprises a second subset of the one or more tuples; and
  determining to not evaluate the second list based on the evaluating the first list;
display a second symbol indicating the one or more aspects associated with the first list; and
display a third symbol indicating that the second list is not evaluated.

14. The processing system of claim 13, wherein:
a combination of an indicator of the first tuple and a modifier of the first tuple defines a condition associated with the first tuple, and
the processor is further configured to cause the processing system to:
  determine the second input does not satisfy the condition associated with the first tuple; and
  receive a third input that satisfies the condition associated with the first tuple.

15. The processing system of claim 13, wherein:
the first list comprises the first tuple and a second tuple;
wherein the processor being configured to cause the processing system to determine, based on the result, the one or more aspects associated with the first list comprises the processor being configured to cause the processing system to:
  evaluate the first list based on the result by:
    determining that the second input contains required input to the first tuple; and
    determining that the second tuple does not require input based on determining that the second input contains the required input to the first tuple; and
  wherein the second symbol further indicates that the second tuple does not require input based on the determining that the second input contains the required input to the first tuple.

16. A non-transitory computer readable medium comprising instructions that, when executed by one or more processors of a computing system, cause the computing system to:
receive a first input comprising one or more tuples, wherein a tuple of the one or more tuples comprises one or more fields associated with an operation, one or more indicators, and one or more modifiers;
receive a second input associated with the one or more tuples;
provide, to a knowledge engine, the first input and the second input;
receive, from the knowledge engine, a result based on the first input and the second input;
determine, based on the result, a first symbol associated with a first tuple of the one or more tuples;
display the first symbol, wherein the first symbol indicates whether the first tuple is complete;
determine that a first list comprises a first subset of the one or more tuples;
determine, based on the result, one or more aspects associated with the first list based on:
  evaluating the first list based on the result;
  determining that a second list comprises a second subset of the one or more tuples; and
  determining to not evaluate the second list based on the evaluating the first list;
display a second symbol indicating the one or more aspects associated with the first list; and
display a third symbol indicating that the second list is not evaluated.

* * * * *